(12) United States Patent
Hayashi et al.

(10) Patent No.: US 6,860,843 B2
(45) Date of Patent: Mar. 1, 2005

(54) PACKAGE, PACKAGE MANUFACTURING METHOD AND PACKAGE MANUFACTURING SYSTEM FOR CARRYING OUT THE PACKAGE MANUFACTURING METHOD

(75) Inventors: Kazuyoshi Hayashi, Shinjuku-Ku (JP); Koji Shimizu, Shinjuku-Ku (JP); Kozo Mita, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 29 days.

(21) Appl. No.: 10/186,620

(22) Filed: Jul. 2, 2002

(65) Prior Publication Data

US 2002/0183181 A1 Dec. 5, 2002

Related U.S. Application Data

(60) Continuation of application No. 09/539,525, filed on Mar. 30, 2000, now abandoned, which is a division of application No. 09/064,319, filed on Apr. 23, 1998, now Pat. No. 6,074,097.

(30) Foreign Application Priority Data

| Apr. 28, 1997 | (JP) | ............................................. 9-111087 |
| Apr. 28, 1997 | (JP) | ............................................. 9-111105 |
| Apr. 28, 1997 | (JP) | ............................................. 9-111110 |
| Apr. 28, 1997 | (JP) | ............................................. 9-111119 |
| May 8, 1997 | (JP) | ............................................. 9-133018 |

(51) Int. Cl.[7] .............................................. B31B 9/14
(52) U.S. Cl. ........................ 493/56; 493/148; 493/199; 493/237
(58) Field of Search ........................ 493/56, 148, 189, 493/194, 195, 196, 199, 200, 229, 232, 235, 237, 238

(56) References Cited

U.S. PATENT DOCUMENTS

| 3,582,466 A |   | 6/1971 | Quirk |
| 3,909,582 A | * | 9/1975 | Bowen .................. 219/121.69 |
| 4,087,002 A | * | 5/1978 | Bambara et al. ............ 206/523 |
| 4,557,377 A |   | 12/1985 | Maloney ...................... 206/219 |
| 4,631,905 A | * | 12/1986 | Maloney ...................... 53/554 |
| 4,634,006 A | * | 1/1987 | Yanase ........................ 383/204 |
| 4,762,514 A |   | 8/1988 | Yoshida ...................... 493/227 |
| 4,898,477 A |   | 2/1990 | Cox et al. ............... 383/209 X |
| 5,080,747 A | * | 1/1992 | Veix ........................... 156/352 |
| RE33,880 E |   | 4/1992 | Yamazaki et al. .......... 383/200 |
| 5,158,499 A | * | 10/1992 | Guckenberger .......... 206/524.2 |
| 5,613,779 A |   | 3/1997 | Niwa ..................... 383/209 X |
| 5,783,266 A |   | 7/1998 | Gehrke ................... 383/207 X |
| 5,830,118 A | * | 11/1998 | Nicholson .................... 493/196 |
| 6,098,874 A |   | 8/2000 | Tokarski ..................... 229/235 |
| 6,427,420 B1 | * | 8/2002 | Olivieri et al. ............... 53/412 |

FOREIGN PATENT DOCUMENTS

| EP | 473 517 A2 | 9/1990 |
| EP | 2046458 | 1/1992 |
| EP | 596747 | 5/1994 |

* cited by examiner

*Primary Examiner*—Eugene Kim
*Assistant Examiner*—Sameh H. Tawfik
(74) *Attorney, Agent, or Firm*—Parkhurst & Wendel, L.L.P.

(57) ABSTRACT

A pair of superposed laminated films are fed by a web feed unit, and a longitudinal heat-sealing unit and a lateral heat-sealing unit unite together the pair of films by heat-sealing. A notch and tearing incision forming unit forms notches and tearing incisions in the pair of films. A cutting unit cuts the thus processed pair of united films into packages.

10 Claims, 9 Drawing Sheets

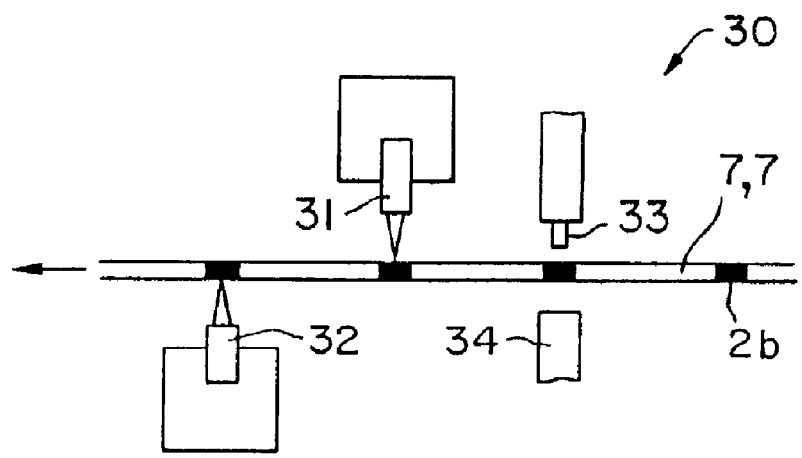
F I G. 2
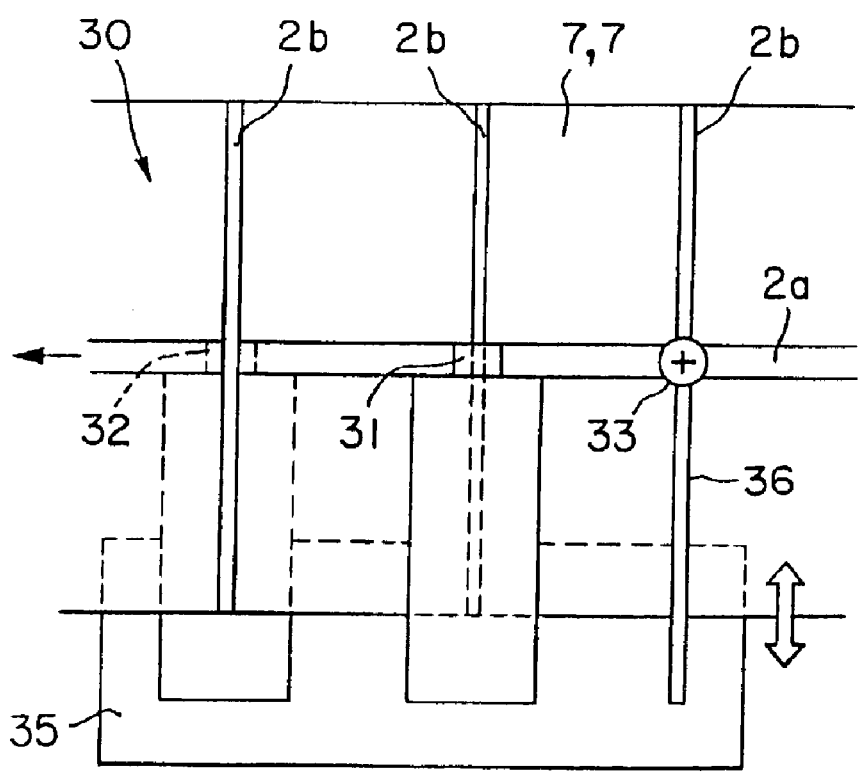
F I G. 3

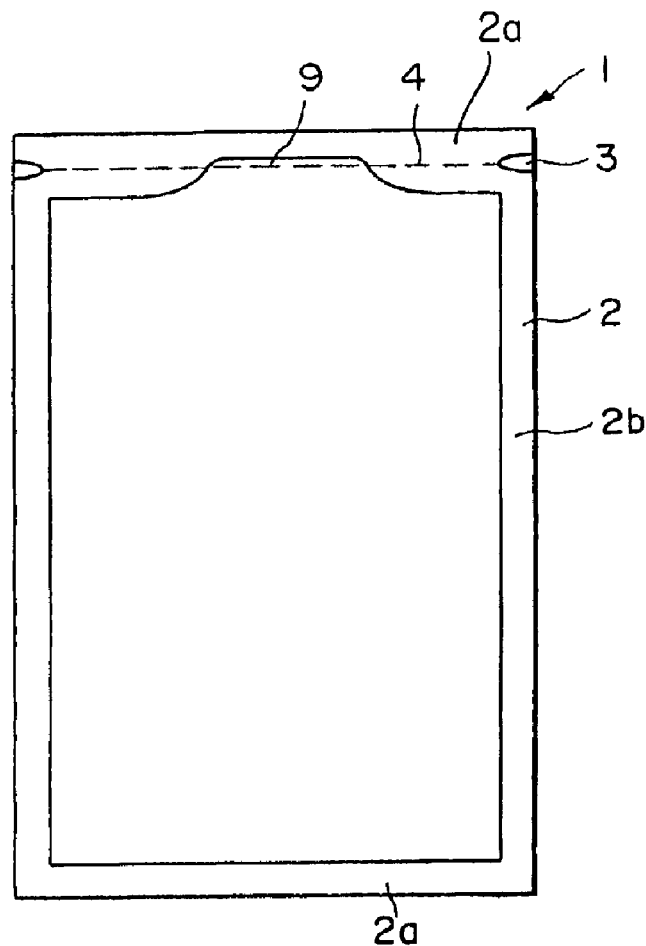
F I G. 5 (a)
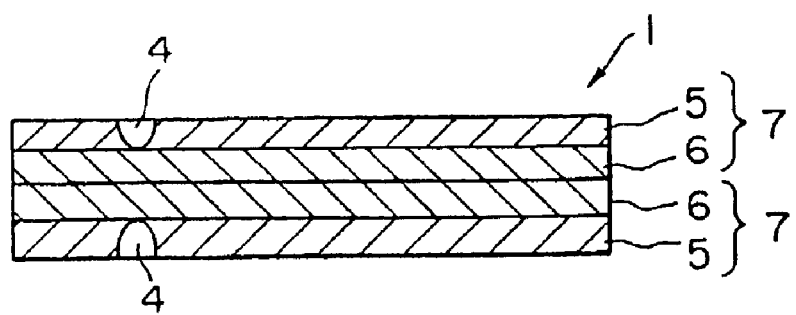
F I G. 5 (b)

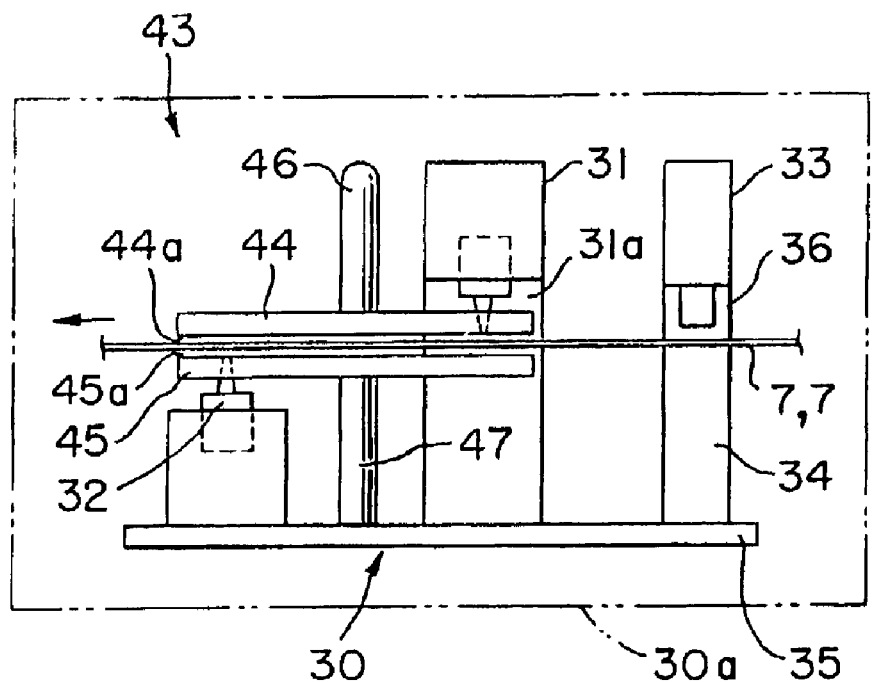
F I G. 7
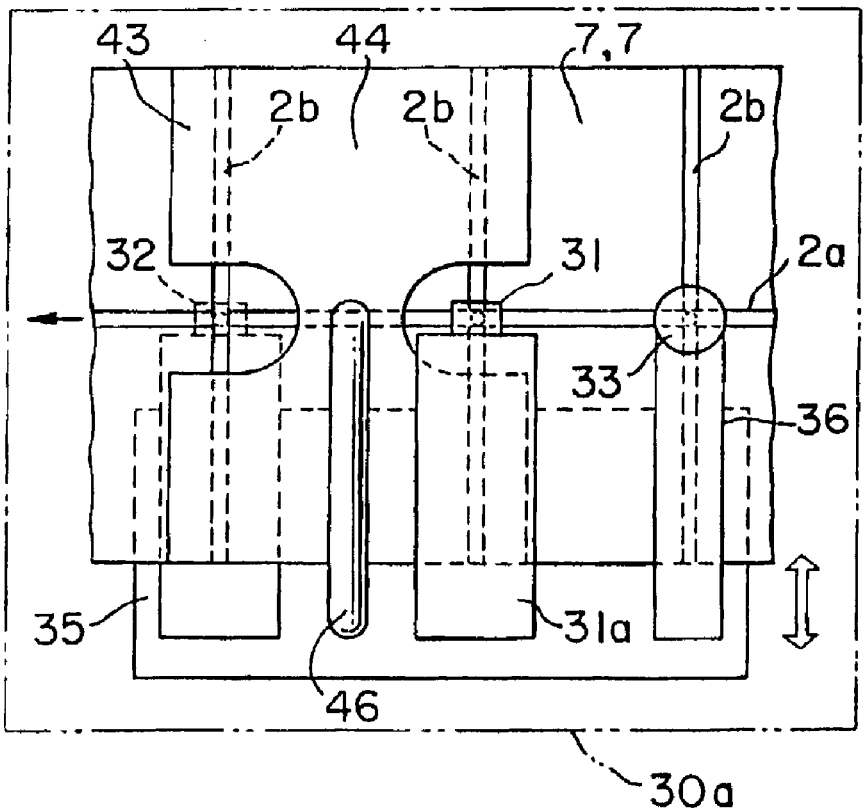
F I G. 8

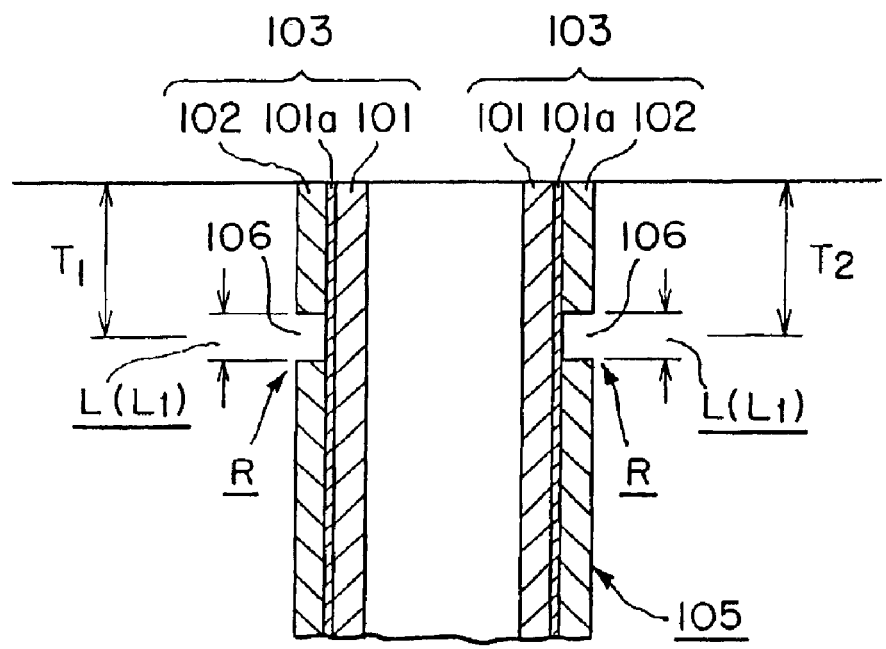
F I G. 11
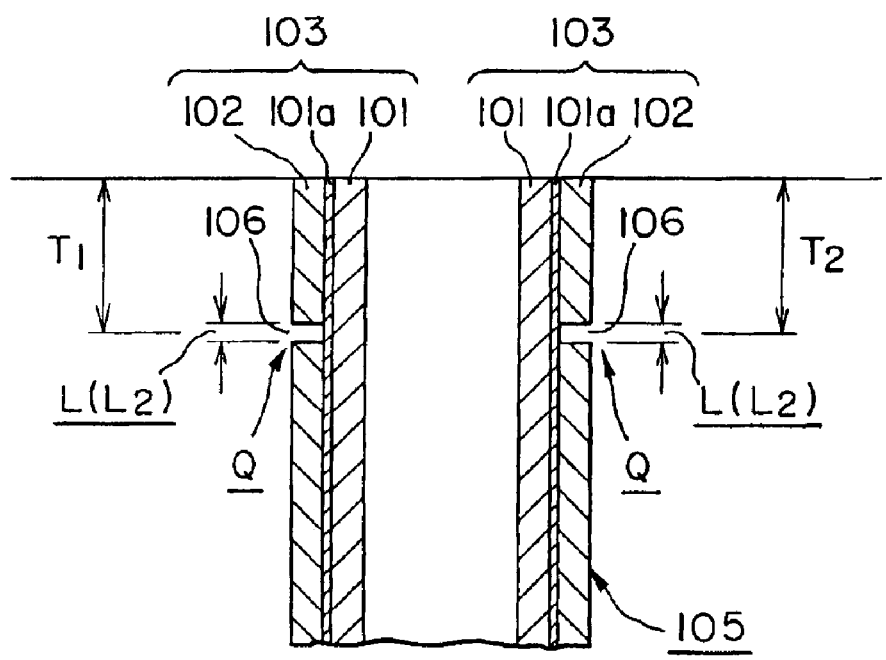
F I G. 12

PACKAGE, PACKAGE MANUFACTURING METHOD AND PACKAGE MANUFACTURING SYSTEM FOR CARRYING OUT THE PACKAGE MANUFACTURING METHOD

This is a Continuation of application Ser. No. 09/539,525 filed Mar. 30, 2000 now abandoned which in turn is a division of Ser. No. 09/064,319 filed Apr. 23, 1998, now U.S. Pat. No. 6,074,097.

BACKGROUND OF THE INVENTION

1. Field of the Invention

The present invention relates to a package for containing a detergent, a food or the like, a method of manufacturing the package, and a package manufacturing system for carrying out the method.

2. Description of the Related Art

A known package for containing a detergent or the like is formed by superposing a pair of films and uniting together the corresponding peripheries of the pair of films by heat-sealing.

Tearing incisions are formed in the outer surfaces of the films. The films are torn along the tearing incisions to form an opening in the package, and the contents of the package is discharged through the opening.

As mentioned above, the package is formed by uniting together the pair of sheets by heat-sealing and tearing incisions are formed in the outer surfaces of the pair of films. If the tearing incisions are not formed in the pair of sheets so as to coincide accurately with each other, it is difficult to tear the films neatly to form a regular opening.

The present invention has been made in view of the foregoing problem and it is therefore an object of the present invention to provide a package formed by uniting together a pair of films and provided with tearing incisions formed in the outer surfaces of the pair of films so as to coincide accurately with each other, a method of manufacturing such a package, and a package manufacturing system for carrying out the method.

SUMMARY OF THE INVENTION

The present invention provides a package manufacturing method for manufacturing a package by uniting films opposite to each other, each having at least a laser beam absorbing layer, said package manufacturing method comprising the steps of: superposing the films; uniting the laminated films; forming tearing incisions on surfaces of the films by heating and melting the laser beam absorbing layers of the films by irradiating the surfaces of the films with laser beams; and cutting the films into a package, a package manufacturing system for manufacturing a package by uniting films opposite to each other, each having at least a laser beam absorbing layer, said package manufacturing system comprising: a film feed line for feeding the films; a heat-sealing unit disposed on the film feed line for uniting the laminated films; a laser beam machining unit for projecting laser beams on respective surfaces of the films to form tearing incisions on the surface of the films by heating and melting the laser beam absorbing layers of the films; and a cutting unit for cutting the laminated films into a package, and a package comprising a pair of superposed films each having at least a laser beam absorbing layer, which is united together by heat-sealing the corresponding peripheries thereof, wherein tearing incisions extending between opposite side edges of the superposed films are formed on surfaces of the films by heating and melting the laser beam absorbing layers.

According to the present invention, the tearing incisions are formed in the outer surfaces of the superposed films by heating and melting parts of the laser beam absorbing layers of the films when manufacturing the package by the package manufacturing system. Therefore, the tearing incisions are formed correctly in the front and the back surface of the package and hence the package can be easily torn along the tearing incisions.

BRIEF DESCRIPTION OF THE DRAWINGS

FIG. 2 is a side view of an upper and a lower laser heating device;

FIG. 3 is a plan view of the upper and the lower laser heating device;

FIG. 5(a) is a plan view of a package in accordance with the present invention;

FIG. 5(b) is a sectional view of a package in accordance with the present invention;

FIG. 7 is a side view of a section of a package manufacturing system in a second embodiment according to the present invention, showing the arrangement of an upper and a lower laser heating devices;

FIG. 8 is a plan view of the upper and the lower laser heating devices;

FIG. 11 is a sectional view taken on line X—X in FIG. 10; and

FIG. 12 is a sectional view taken on line $X_1$—$X_1$ in FIG. 10.

DESCRIPTION OF THE PREFERRED EMBODIMENTS

First Embodiment

Figure 1:
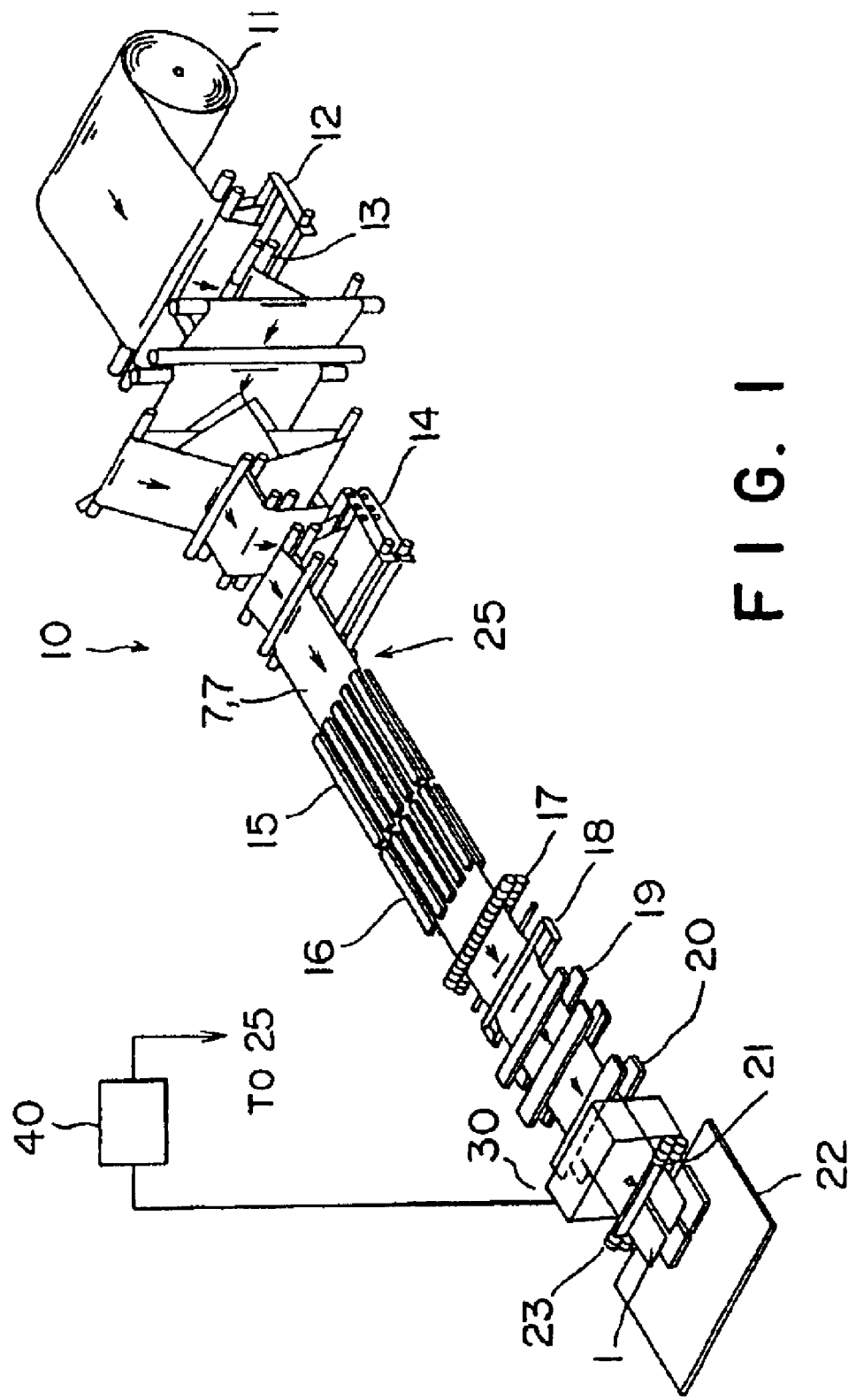
FIG. 1 is a perspective view of a package manufacturing system in a first embodiment according to the present invention.

Preferred embodiments of the present invention will be described hereinafter with reference to the accompanying drawings. FIGS. 1 to 5(a) and 5(b) illustrates a package, a method of manufacturing the package and a package manufacturing system in a first embodiment according to the present invention.

First the package 1 in accordance with the present invention will be described with reference to FIGS. 5(a) and 5(b). Referring to FIGS. 5(a) and 5(b), the package 1 has a pair of laminated films 7 superposed one on top of the other. The corresponding peripheral parts of the pair of laminated films 7 are united together by heat-sealing to form heat-sealed part 2. FIG. 5(a) is a plan view of the package 1 and FIG. 5(b) is a sectional view of the package 1.

Each of the laminated films 7 has at least a laser beam absorbing layer 5 capable of absorbing a laser beam, and a laser beam nonabsorbing layer 6 incapable of absorbing a laser beam. The pair of laminated films 7 are superposed with the laser beam nonabsorbing layers 6 thereof facing each other. The heat-sealed part 2 has longitudinal heat-sealed sections 2a and lateral heat-sealed sections 2b. In FIG. 5(b), the lower longitudinal heat-sealed section 2a at the lower end of the package 1 is open before the package 1 is filled with contents and is closed after filling up the package 1 with the contents.

The package 1 is provided in its side edges with a pair of notches 3, and tearing incisions 4 are formed in the outer surfaces of the laminated films 7 so as to extend between the notches 3. The tearing incisions 4 are formed by irradiating the laser beam absorbing layers 5 serving as the outer surfaces of the package 1 with a laser beam to heat and melt parts of the laser beam absorbing layers 5.

Thus, the tearing incisions 5 are formed in the front and the back surfaces of the package 1 between the side edges of the package 1.

As shown in FIG. 5(a), the tearing incisions 4 extend through the upper longitudinal heat-sealed section 2a and an unsealed region 9. Therefore, an opening is formed in the unsealed region 9 when the package 1 is torn along the tearing incisions 4.

Each laminated film 7 consists of the laser beam absorbing layer 5 and the laser beam nonabsorbing layer 6 and, since the laser beam absorbing layer 5 is a basic component of a packaging bag, the laser beam absorbing layer 5 may be a tough film or sheet of a resin having excellent mechanical, physical and chemical properties, such as a polyester resin, polyamide resin, a polyaramid resin, a polypropylene resin, a polycarbonate resin, a polyacetal resin, a fluoroethylene resin or the like.

A film or sheet of such a resin serving as the laser beam absorbing layer 5 may be an unoriented film, a uniaxial oriented film or a biaxial oriented film.

According to the present invention, the resin film may be formed in a thickness sufficient to secure the least necessary strength and rigidity. If the resin film has an excessively big thickness, the tearing incisions cannot be properly formed by laser beam machining in the resin film, the resin film cannot be satisfactorily torn, the resin film is costly. The strength and the rigidity of the resin film are not high enough if thickness of the resin film is excessively small.

Therefore, according to the present invention, the thickness of the resin film is in the range of about 10 to about 50 $\mu$m, more preferably, in the range of about 12 to about 25 $\mu$m.

According to the present invention, it is most preferable to use, as the laser beam absorbing layer, a biaxial oriented polyamide film or a polyester film, having rigidity, excellent in mechanical toughness, elasticity, penetration resistance, shock resistance, low-temperature resistance, high-temperature resistance, and chemical resistance, such as solvent resistance, and having high printability.

The orientation of the polymers of such a biaxial oriented polyamide film is nearly the same as a feed direction in which the biaxial oriented polyamide film is fed, discrepancy in the mode of tearing between the superposed biaxial oriented polyamide films is very small, and tearing incisions can be easily formed by laser beam machining in such a biaxial oriented polyamide film or the like because the wavelength of a laser beam projected by a carbon dioxide gas laser is within the absorption band of the biaxial oriented polyamide film.

Such a biaxial oriented polyamide film may be a non-coated biaxial oriented film or a polyvinylidene-chloride-coated biaxial oriented film of nylon 6, nylon 66, nylon 11, nylon 12 or nylon 610.

The laser beam nonabsorbing layer 6 may be a film or sheet capable of being satisfactorily heat-sealed and having a low laser beam absorbing property. More specifically, the laser beam nonabsorbing layer 6 may be a film capable of being fused by heat and welded, such as a single-layer film or a laminated film of one or some of acid-modified polyolefin resins each produced by modifying a polyolefin resin, such as a low-density polyethylene, a medium-density polyethylene, a high-density polyethylene, a linear low-density polyethylene, polypropylene, an ethylene-vinyl acetate copolymer, an ionomer resin, an ethylene-ethyl acrylate copolymer, an ethylene-acrylate copolymer, an ethylene-methacrylate copolymer, an ethylene-propylene copolymer, a methyl pentene polymer, polyethylene or polypropylene by an unsaturated carboxylic acid, such as acrylic acid, methacrylic acid, maleic unhydride, fumaric acid or the like, and other resins.

The thickness of the film to be used as the laser beam nonabsorbing layer 6 is 10 $\mu$m or above, preferably, 40 $\mu$m or above, more preferably, in the range of 80 to about 300 $\mu$m.

Desirably, the ratio of the thickness of the heat-sealable resin film to that of the resin film serving as the laser beam absorbing layer 5 is in the range of about two to about twenty, preferably, in the range of four to about ten.

A film of such a thickness to be used as the laser beam nonabsorbing layer 6 has a high rigidity and a high strength, and a package formed by uniting together a pair of films each having the laser beam nonabsorbing layer 6 of a film of such a thickness and the laser beam absorbing layer 5 of a resin film having a high strength has a satisfactory shape maintaining property felicitating work for refilling the package with the contents and work for handling the package during distribution and at the store, and maintains a contents keeping ability.

According to the present invention, it is most preferable to use a film or sheet of a resin containing a linear low-density polyethylene or a ethylene-vinyl acetate copolymer as a principal component as the laser beam nonabsorbing layer 6

A film of a resin containing a linear low-density polyethylene or a ethylene-vinyl acetate copolymer as a principal component has a tackiness, is resistant to the propagation of fissures and a high shock resistance. Since the laser beam nonabsorbing layer is always in contact with the contents, the film of a resin containing a linear low-density polyethylene or a ethylene-vinyl acetate copolymer is effective in preventing the reduction of resistance to environmental stress cracking.

According to the present invention, the linear low-density polyethylene or the ethylene-vinyl acetate copolymer for forming the film serving as the laser beam nonabsorbing layer 6 may be blended with another resin. If the laser beam nonabsorbing layer 5 is formed from a film of the linear low-density polyethylene or the ethylene-vinyl acetate copolymer blended with an ethylene-butene copolymer, the heat resistance of the film is lower than that of the film of the linear low-density polyethylene or the ethylene-vinyl acetate copolymer, and the stability of the sealed part of the film tends to be deteriorated in a high-temperature environment, but the film has an improved tearing property which facilitate opening the package.

A linear low-density polyethylene film as the heat-sealable resin film may be a film or sheet of an ethylene-αolefin copolymer produced by polymerization using a metallocene catalyst.

The metallocene catalyst employed in producing the ethylene-α-olefin copolymer by polymerization may be a metallocene catalyst prepared by combining a metallocene and an alumoxane, such as a catalyst prepared by combining, for example, zirconocene dichloride and methyl alumoxane.

Whereas current catalysts are heterogeneous at the active site and are called multisite catalysts, the metallocene catalyst is called a single-site catalyst because the same is homogeneous at the active site.

The laser beam nonabsorbing layer 6 may be a film of an ethylene-α-olefin copolymer producing by polymerization using a metallocene catalyst, such as CARNEL® available from Mitubishi Kagaku K. K., EVOLUE® available from Mitsui Sekiyu Kagaku Kogyo K. K., EXACT® available from Exxon Chemical of USA, or AFFINITY® or ENGAGE® available from Dow Chemical of USA.

According to the present invention, the film of the ethylene-α-olefin copolymer may be used in a coating film of a compound containing the resin.

The film serves as a single or laminated sealing layer of a thickness of the film is in the range of 5 to about 300 μm, preferably, in the range of 10 to about 100 μm When manufacturing a package by bonding together a pair of such heat-sealable resin films or sheets of the ethylene-α-olefin copolymer produced by polymerization using a metallocene catalyst, the resin films can be bonded together by low-temperature heat-sealing.

An intermediate layer having a barrier property may be formed between the laser beam absorbing layer 5 and the laser beam nonabsorbing layer 6. The intermediate layer having a barrier property may be a film capable of intercepting light, such as sunlight, or a film impermeable to water vapor, water or gases, such as oxygen gas and such. The film serving as the intermediate layer may be a film of a single material or a film of a compound material produced by combining a plurality of materials.

More specifically, the film serving as the intermediate layer may be a resin film coated with an aluminum foil or an aluminum film deposited by evaporation and having both shading and barrier properties, a resin film coated with an inorganic oxide film deposited by evaporation and having a barrier property, such as a silicon dioxide film, or an alumina film, a film or sheet impermeable to water vapor and water, such as a film or sheet of a low-density polyethylene, a medium-density polyethylene, a high-density polyethylene, a linear low-density polyethylene, polypropylene or an ethylene-propylene copolymer, a film or sheet having a gas-barrier property, such as a film or sheet of polyvinylidene chloride, polyvinyl alcohol, a saponified ethylene-vinyl acetate copolymer, or a film or sheet of a shading colored resin prepared by kneading a mixture prepared by mixing a resin, a coloring matter, such as a pigment, and desired additives. The film may be formed of one or some of those materials.

Although the thickness of the film or sheet serving as the intermediate layer is optional, it is desirable that the thickness of the film or sheet serving as the intermediate layer is in the range of 5 to about 300 μm, more preferably, in the range of 10 to about 100 μm.

The aluminum foil may be of a thickness in the range of 5 to about 30 (m. The aluminum or the inorganic oxide film deposited by evaporation may of a thickness in the range of 100 to about 2000 Å.

The resin film coated with the evaporated film may be, for example, a polyester film, a polyamide film, a polyolefin film, a vinyl chloride film, a polycarbonate film, a polyvinylidene chloride film, a polyvinyl alcohol film, a saponified ethylene-vinyl acetate copolymer film or the like.

The inorganic oxide forming the evaporated inorganic oxide film may be, for example, silicon oxide ($SiO_x$), alumina, indium oxide, tin oxide, zirconium oxide or the like.

The inorganic oxide may be a mixture of silicon oxide and silicon dioxide, or a mixture of silicon dioxide and alumina.

The thin inorganic oxide thin film may be formed by a vacuum evaporation method, such as an ion beam evaporation method or an electron beam evaporation method, or a sputtering method.

Usually, the preferable thickness of the inorganic oxide thin film is in the range of 100 to about 2000 Å to provide the inorganic oxide thin film with a sufficient barrier property, According to the present invention it is desirable that the thickness of the inorganic oxide thin film is in the range of 200 to about 1500 Å.

If the thickness of the inorganic oxide thin film is greater than 1500 Å, more particularly, greater than 2000 Å, the inorganic oxide thin film is liable to crack to deteriorate its barrier property and to increase its material cost. If the thickness of the inorganic oxide thin film is less than 100 Å, particularly, less than 200 Å, the inorganic oxide thin film is scarcely effective.

Usually, the package is used under severe physical and chemical conditions, the component laminated films must meet severe requirements of packages, such as strength resisting deformation, drop-and-impact strength, pinhole resistance, heat resistance, sealing performance, quality maintenance performance, workability, hygienic compatibility and the like. The present invention may employ materials meeting those conditions other than the foregoing materials. Suitable laminated films as the component laminated films of the packages of the present invention, by way of example, are films or sheets of low-density polyethylenes, medium-density polyethylenes, high-density polyethylenes, linear low-density polyethylenes, polypropylene, ethylene-propylene copolymers, ethylene-vinyl acetate copolymers, ionomer resins, ethylene-ethyl acrylate copolymers, ethylene-acrylate copolymers, ethylene-methacrylate copolymers, methyl pentene polymers, polybutene resins, polyvinyl chloride resins, polyvinyl acetate resins, polyvinylidene chloride resins, vinyl chloride-vinylidene chloride copolymers, polymethacrylate resins, polyacrylonitrile resins, polystyrene resins, acrylonitrile-styrene copolymers (AS resins), acrylonitrile-butadiene-styrene copolymers (ABS resins), polyester resins, polyamide resins, polycarbonate resins, polyvinyl alcohol resins, saponified ethylene-vinyl acetate copolymers. fluorocarbon resins, diene resins, polyacetal resins, polyurethane resins, nitrocellulose and the like.

Cellophane and synthetic paper sheets may be used.

According to the present invention, the foregoing films or sheets may be unoriented, uniaxial oriented or biaxial oriented films or sheets.

The thickness of the films or sheets is optional, but the thickness may be in the range of several micrometers to about 300 μm.

According to the present invention, the films or sheet may be produced by an extrusion process, an inflation process or a coating process.

A method of manufacturing a two-layer laminated film by laminating the heat-sealable resin film as the laser beam nonabsorbing layer 6, and the high-strength resin film as the laser beam absorbing layer 5 or a method of manufacturing a three-layer laminated film by laminating the heat-sealable resin film as the laser beam nonabsorbing layer 6, the base film having a barrier property as the intermediate layer, and the high-strength resin film as the laser beam absorbing layer 5 will be described hereinafter. The method of manufacturing the laminated film may employ a lamination process employed in manufacturing ordinary packaging materials, such as a wet lamination process, a dry lamination method, a solventless dry lamination process, an extrusion lamination process, a coextrusion lamination process or the like.

According to the present invention, the component films of the laminated film may be subjected, if necessary, to a pretreatment process, such as a corona discharge treatment or an ozone treatment. The present invention may use an anchor coating material, such as an isocyanate (urethane) coating material, polyethylene imine coating material, a polybutadiene coating material, or an organic titanium coating material, or a laminating adhesive, such as a polyurethane adhesive, a polyacrylic adhesive, a polyester adhesive, an epoxy adhesive, a polyvinyl acetate adhesive, a cellulose adhesive or the like.

In the foregoing method of manufacturing a laminated film employing an extrusion lamination process, an adhesive resin layer may be formed of polyethylene, ethylene-α-olefin copolymer, polypropylene, polybutene, polyisobutene, polyisobutylene, polybutadiene, polyisoprene, a copolymer of ethylene and a unsaturated carboxylic acid, such as an ethylene-methacrylate copolymer or an ethylene-acrylate copolymer, an acid-modified polyolefin resin, an ethylene-ethyl acrylate copolymer, an ionomer resin or an ethylene-vinyl acetate copolymer.

In the foregoing method of manufacturing a laminated film employing a dry lamination process, an adhesive resin layer may be formed of a two-component urethane adhesive, a poly(ester urethane) adhesive, a poly(ether urethane) adhesive, an acrylic adhesive, a polyester adhesive, a polyamide adhesive, polyvinyl acetate adhesive, an epoxy adhesive, a rubber adhesive or the like.

A package manufacturing system will be described hereinafter. Referring to FIGS. 1 to 4, a package manufacturing system 10 has a web feed unit 11 which unwinds a web of a pair of laminated films 7 from a web roll, and a first dancer roller unit 12, feed rollers 13 and a second dancer roller unit 14 arranged in that order downstream the web feed unit 11 with respect to a web feed direction.

The first dancer roller unit 12 and the second dancer roller unit 14 store a length of the web of the pair of laminated films 7 temporarily to enable the web of the pair of laminated films 7 to be fed intermittently in a section of the package manufacturing system 10 below the second dancer roller unit 14 with respect to the web feed direction while the web feed unit 11 unwinds the web continuously.

A longitudinal heat-sealing unit 15 for forming longitudinal heat-sealed sections 2a in the web by longitudinally heat-sealing the pair of laminated films 7, and a longitudinal cooling unit 16 for cooling the longitudinal heat-sealed sections 2a are disposed successively below the second dancer roller unit 14 with respect to the web feed direction. A pair of rubber rollers 17 for carrying the pair of laminated films 7, and a constant-tension device 18 for exerting a fixed tension on the pair of laminated films 7 are disposed on the downstream side of the longitudinal cooling unit 16 with respect to the web feed direction.

A lateral heat-sealing unit 19 for forming lateral heat-sealed sections 2b in the web by laterally heat-sealing the pair of laminated films 7, and a lateral cooling unit 20 for cooling the lateral heat-sealed sections 2b are disposed successively below the constant-tension device 18 with respect to the web feed direction.

A notch and tearing incision forming unit 30 for forming notches 3 and tearing incisions 4 in the pair of laminated films 7 is disposed on the downstream side of the lateral cooling unit 20 with respect to the web feed direction, and a cutting unit 21 for cutting the pair of laminated films 7 into packages 1 and delivery rubber rollers 23 are disposed on the downstream side of the notch and tearing incision forming unit 30 with respect to the web feed direction.

A package delivery unit 22 for delivering the packages 1 is disposed on the downstream side of the cutting unit 21 with respect to the web feed direction. These apparatus from the web feed unit 11 to the package delivery unit 22 shown in FIG. 1 form a film feed line 25.

The notch and tearing incision forming unit 30 will be described with reference to FIGS. 2 and 3. Referring to FIGS. 2 and 3, the notch and tearing incision forming unit 30 has notching devices 33 for forming two notches 3 in the opposite end parts of the packages 1 next to each other, upper laser heating devices (carbon dioxide gas lasers) 31 for forming two tearing incisions 4 in the upper laminated film 7, which is and lower laser heating devices (carbon dioxide lasers) 32 for forming two tearing incisions 4 in the lower laminated film 7, spaced a distance equal to the width of the package 1, i.e., a feed pitch at which the pair of laminated films 7 are advanced, apart from the upper laser heating devices 31 on the downstream side of the upper laser heating devices 31 with respect to the web feed direction. The notching device 33 forms the notches 3 in the pair of laminated films 7. A support block 34 is disposed under the notching device 33. The notching device 33 and the support block 34, the upper laser heating devices 31 and the lower laser heating devices 32 are supported on a base 35. The notching device 33 and the support block 34 are supported by a support structure 36 on the base 35. The film feed line 25 and the notch and tearing incision forming unit 30 are controlled for operation by a control unit 40. The notching devices 33 may be disposed on the downstream side of the upper laser heating devices 31 or the lower laser heating devices 32 with respect to the web feed direction.

The operation of the package manufacturing system 10 will be described below. Referring to FIG. 1, the control unit 40 controls the web feed unit 11 for operation to feed the laminated films 7 continuously from the web roll at an optional feed speed. Each of the laminated films 7, in this embodiment, is a laminated structure formed by laminating a nylon film serving as the laser beam absorbing layer 5, and a linear low-density polyethylene film serving as a laser beam nonabsorbing layer 6 by a dry lamination process.

The pair of laminated films 7 is advanced through the first dancer roller unit 12, the feed rollers 13, and the second dancer roller unit 13 to the longitudinal heat-sealing unit 15. The longitudinal heat-sealing unit 15 units (bonds) substantially middle parts with respect to width of the pair of laminated film 7 to form longitudinal heat-sealed sections 2a. In a section of the film feed line 25 below the longitudinal heat-sealing unit 15 with respect to the web feed direction, the pair of laminated films 7 are fed intermittently according to a signal provided by the control unit 40. A temporary slack in the pair of laminated films 7 in a section of the film feed line 25 between the web feed unit 11 and the longitudinal heat-sealing unit 15 is taken up by the first dancing roller unit 12 and the second dancing roller unit 14. The longitudinal heat-sealed sections 2a are cooled by the longitudinal cooling unit 16, and the pair of laminated films 7 are advanced through the rubber rollers 17 and the constant tension device 18 to the lateral heat-sealing unit 19.

The lateral heat-sealing unit 19 forms lateral heat-sealed sections 2b in the pair of laminated films 7, and then the lateral cooling unit 20 cools the lateral heat-sealed sections 2b. Thus, the longitudinal heat-sealed sections 2a and the lateral heat-sealed sections 2b are formed in the pair of laminated films 7 by the longitudinal heat-sealing unit 15 and the lateral heat-sealing unit 19 to define two rows of packages 1 in the pair of laminated films 7. The opposite side edge parts of the laminated films 7 are not united and the are left open to leave an open end in each of the packages 1. The open end is closed by forming a longitudinal heat-sealed section 2a by heat-sealing after filling the package 1 with contents.

Then, the notch and tearing incision forming unit 30 forms notches 3 and tearing incisions 4 in the pair of laminated films 7. Upon the reception of the pair of laminated films 7, the notching devices 33 of the notch and tearing incision forming unit 30 cuts parts of the pair of laminated films 7 to form two notches 3 in the longitudinal heat-sealed sections 2a formed in a substantially middle parts of the pair of laminated films 7. One of the notches 3 is for the packages 1 on one of the two rows and the other notch 3 is for the package 1 on the other row. The notches 3 are formed at positions on the opposite lateral edge parts of the package 1. The notches 3 may be formed in the shape of the letter U, the letter I or the letter V.

The upper laser heating devices 31 irradiate the upper laminated film 7 with laser beams. Then, the nylon film of the upper laminated film 7 absorbs the laser beams, so that parts of the nylon film is heated and fused to form two tearing incisions 4. One of the tearing incisions 4 is for the package 1 on one of the two rows, and the other tearing incision 4 is for the package 1 on the other row. Subsequently, the lower laser heating devices 32 irradiates the lower laminated film 7 with laser beams to form two tearing incisions 4 in the lower laminated film 7. The starting points of the tearing incisions 4 formed by the lower laser heating devices 32 are one feed pitch behind those of the tearing incisions 4 formed by the upper laser heating devices 31.

Figure 4:
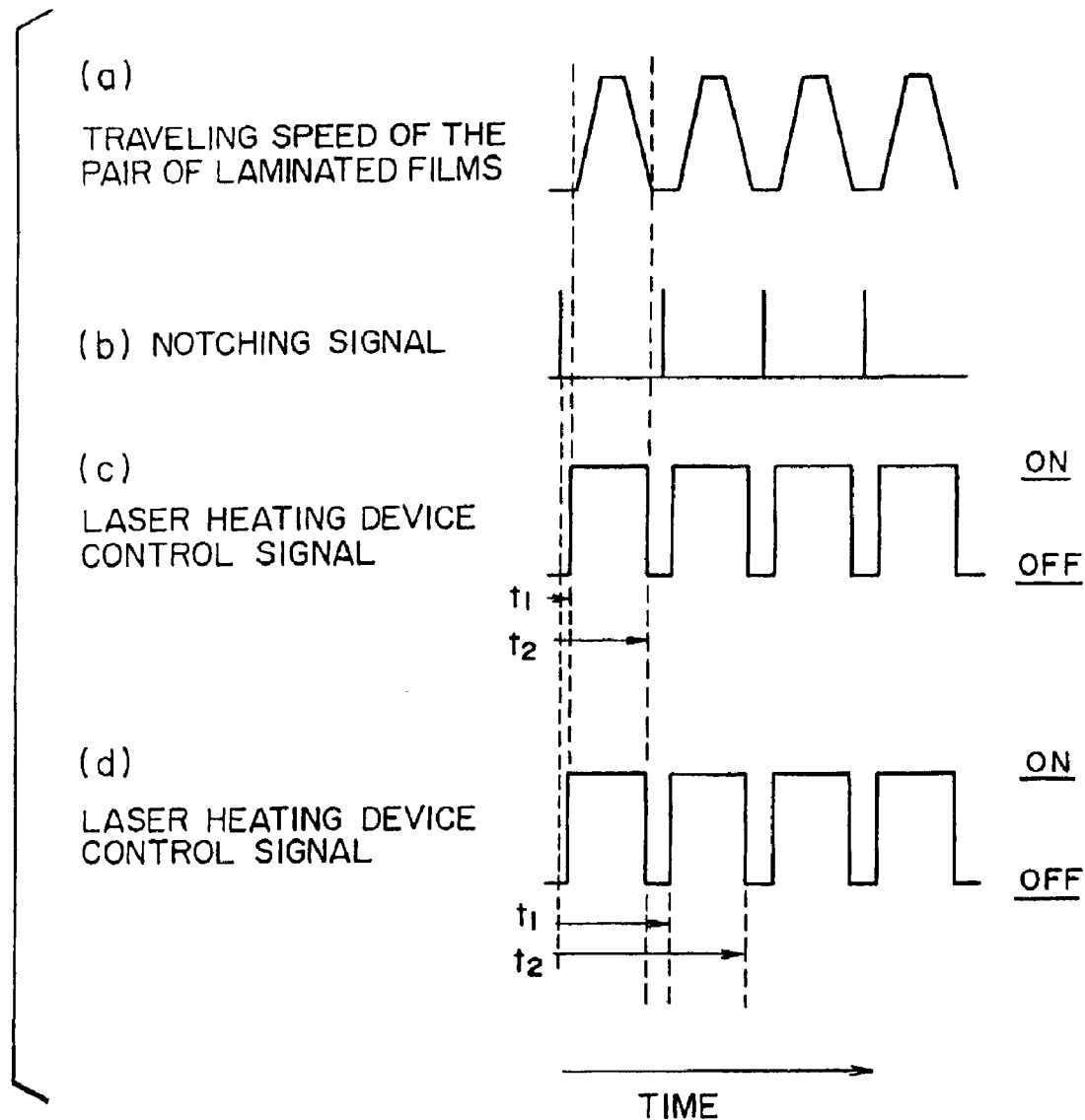
FIG. 4 is a diagram of assistance in explaining the timing of operation of the upper and the lower laser heating device.

FIG. 4 is a diagrammatic view of assistance in explaining the timing of operations of the notch and tearing incision forming unit 30 controlled by the control unit 40. Referring to FIG. 4(a) showing the variation of the traveling speed of the pair of laminated films 7 with time, the film feed line 25 operates according to a film feed signal provided by the control unit 40 to advance the pair of laminated films 7 intermittently at a feed pitch corresponding to the width of the packages 1. Meanwhile, the notching devices 33 are actuated by a notching signal provided by the control unit 40 as shown in FIG. 4(b) to form the notches 3 while the pair of laminated films 7 are kept stationary.

Referring to FIG. 4(c), the control unit 40 provides control signals to control the operations of the upper laser heating devices 31 and the lower laser heating devices 32 so that the upper laser heating devices 31 and the lower laser heating devices 32 are turned on at a first moment a first time $t_1$ after a moment when a notching signal is provided and the same are turned off at a moment a second time $t_2$ after the moment when the same notching signal is provided. The pair of laminated films 7 are moved and the laser beams are projected continuously by the laser heating devices 31 and 32 in a time interval equal to the difference between the times $t_1$ and $t_2$. The traveling speed of the pair of laminated films 7 increases gradually from zero to a maximum, remains at the maximum for a certain time, and decreases gradually to zero as shown in FIG. 4(a). Accordingly, parts of the pair of laminated films 7 near the notches 3 of the package 1 receive a relatively large quantity of energy of the laser beams, and middle parts of the laminated films 7 receive a relatively small quantity of energy of the laser beams and, consequently, the width of end sections of each tearing incision 4 near the notches is greater than that of the same in the middle section of the package 1. Therefore, the pair of laminated films 7 can be smoothly torn from the notch 3 along the tearing incisions 4 to open the package 1. Since the pair of laminated films 7 are irradiated with the laser beams only while the same are traveling, any pinholes, which may possibly be formed if the pair of laminated films 7 are irradiated with the laser beams while the pair of laminated films 7 are stationary, will not be formed in the pair of laminated films 7.

Although the upper laser heating devices 31 and the lower laser heating devices 32 are turned on in a standard mode of operation for the time interval equal to the difference between the times $t_1$ and $t_2$, if the time $t_1$ is excessively short, the times $t_1$ and $t_2$ may be those measured from a point of time when the notching signal for the preceding notching cycle is given as shown in FIG. 4(d).

In the package manufacturing system 10 in the first embodiment, the notches 3 and the tearing incisions 4 are formed in the pair of laminated films 7 by the notch and tearing incision forming unit 30 after uniting together the pair of laminated films 7 by the longitudinal heat-sealing unit 15 and the lateral heat-sealing unit 19. Therefore, the notches 3 and the tearing incisions 4 can be accurately positioned. Since the upper laser heating devices 31, the lower laser heating devices 32 and the notching device 33 are mounted on the base 35, the respective positions of the upper laser heating devices 31, the lower laser heating devices 32 and the notching device 33 relative to each other are fixed. Therefore, the notches 3, the tearing incision 4 in the upper laminated film 7 and the tearing incision 4 in the lower laminated film 7 can be accurately aligned. The respective positions of the pair of tearing incisions 4 and the notches 3 can be easily changed simply by shifting the base 35.

The package 1 can be smoothly torn along the tearing incisions 4 formed in the upper and the lower laminated films 7 starting from the notch 3.

Figure 6:
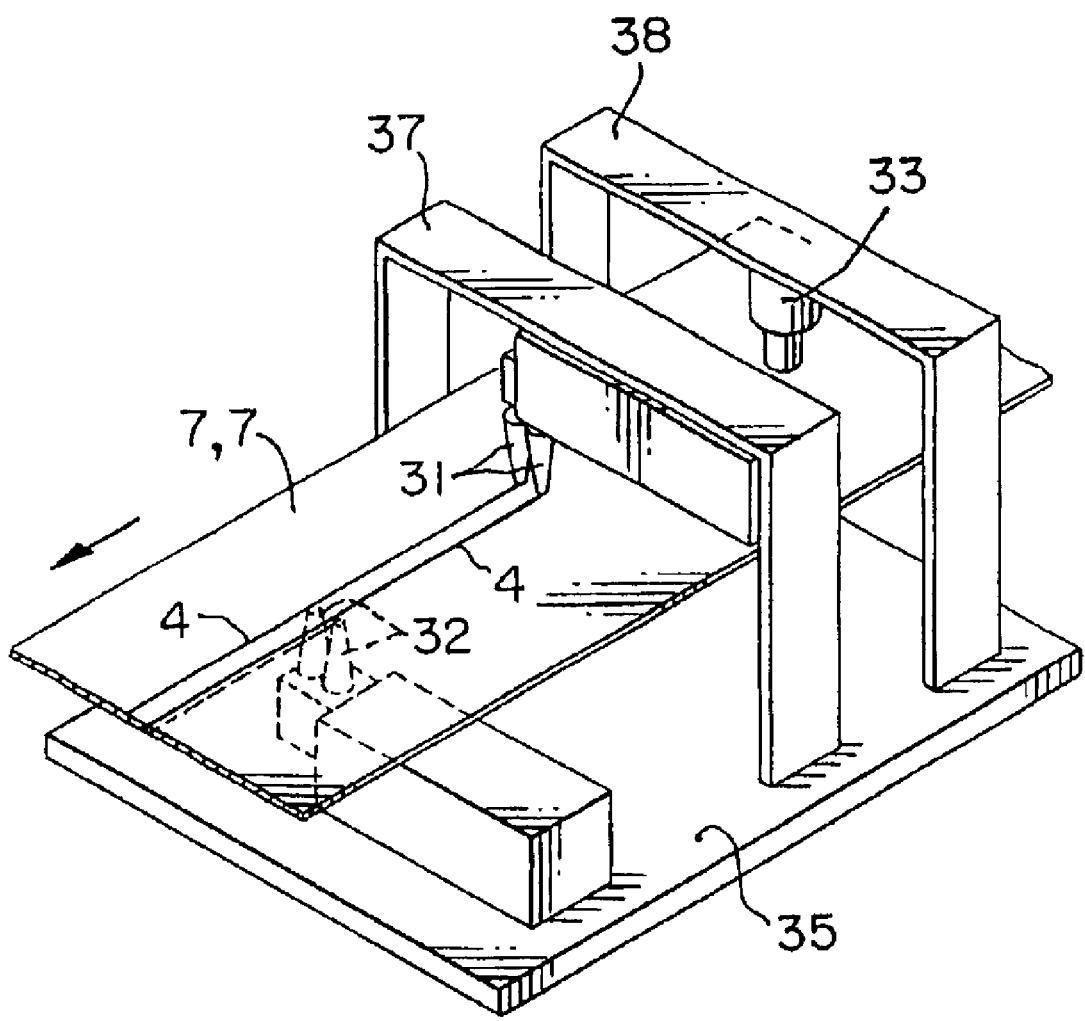
FIG. 6 is a perspective view of a laser heating device holding structure for holding the upper and the lower laser heating devices, in a modification.

A support structure for supporting the upper laser heating devices 31, the lower laser heating devices 32 and the notching device 33, in a modification will be described with reference to FIG. 6. Referring to FIG. 6, the upper laser heating device 31 and the notching device 33 may be attached to gantry type support structures 37 and 38 set on the base 35. The lower laser heating devices 32 are attached directly to the base 35.

Although the upper laser heating devices 31 and the lower laser heating devices 32 are spaced apart a distance corresponding to one feed pitch from each other in the foregoing embodiment, the upper laser heating devices 31 and the lower laser heating devices 32 may be disposed on the opposite sides of the pair of laminated films 7, respectively, so that the laser beams projected by the upper laser heating devices 31 and those projected by the lower laser heating devices 32 are inclined to each other.

As is apparent from the foregoing description, according to the present invention, the package can be easily, simply and neatly torn along the tearing incisions formed in the pair of laminated films, so that a regular opening can be formed in the package.

Second Embodiment

Figure 9:
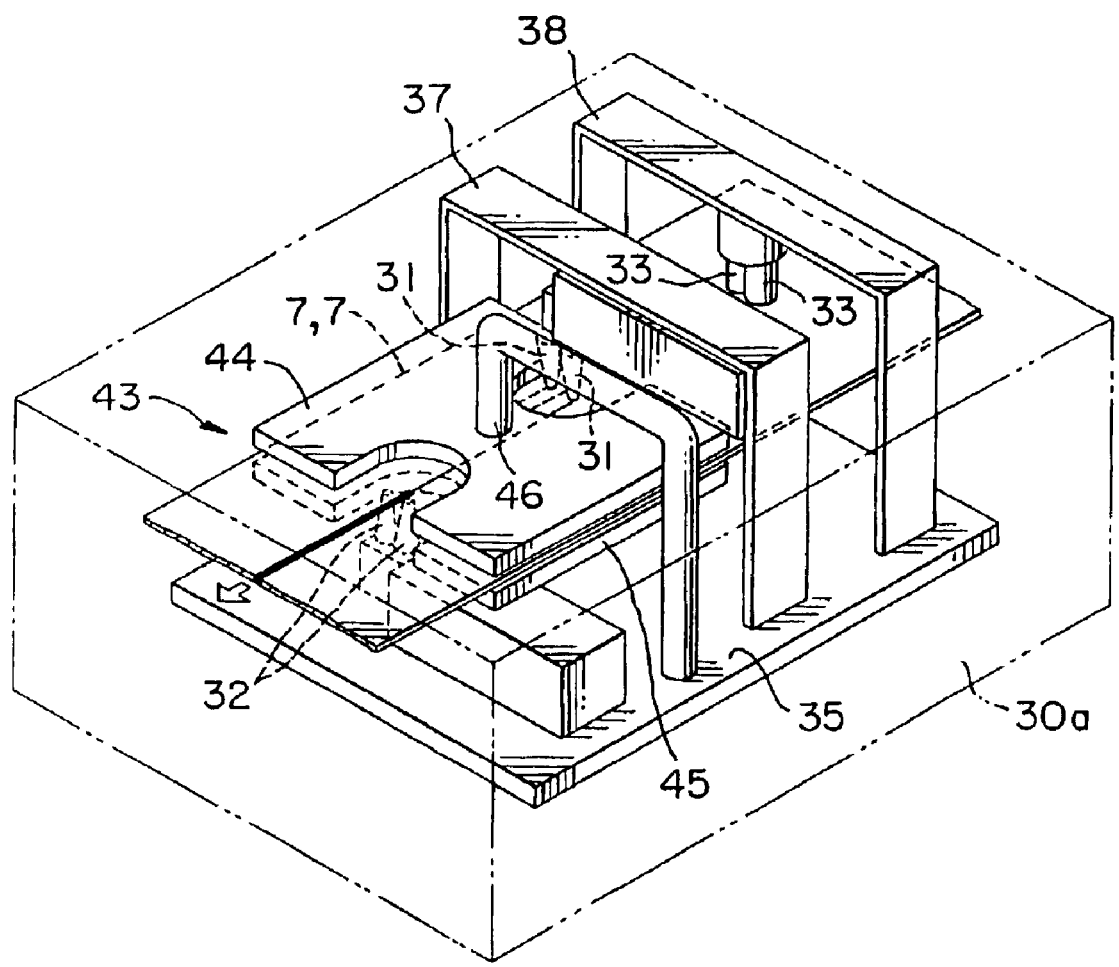
FIG. 9 is a perspective view of another laser heating device holding structure for holding the upper and the lower laser heating devices.

A package manufacturing system 10 in a second embodiment according to the present invention will be described hereinafter with reference to FIGS. 7 to 9, in which parts like or corresponding to those shown in FIGS. 1 to 6 are designated by the same reference characters and detailed description thereof will be omitted. Components of the package manufacturing system 10 in the second embodiment excluding a notch and tearing incision forming unit 30 thereof are the same as those of the package manufacturing system 10 in the first embodiment shown in FIGS. 1 to 6.

Referring to FIGS. 7 and 8, the notch and tearing incision forming unit 30 has notching devices 33 for forming notches 3 in an end edge part of the package 1, upper laser heating devices (carbon dioxide gas lasers) 31 for forming two tearing incisions 4 in the upper laminated film 7, and lower laser heating devices (carbon dioxide lasers) 32 for forming two tearing incisions 4 in the lower laminated film 7, disposed a distance equal to the width of the package 1, i.e., a feed pitch at which the pair of laminated films 7 are advanced, apart from the upper laser heating devices 31 on the downstream side of the upper laser heating devices 31 with respect to the web feed direction. The notching devices 33 forms the notches 3 in the pair of laminated films 7. A support block 34 is disposed under the notching device 33. The notching devices 33 cuts parts of the pair of laminated films 7 to form two notches 3 for one package 1. A support block 34 is disposed under the notching devices 33. The notching devices 33 and the support block 34, the upper laser heating devices 31 and the lower laser heating devices 32 are supported on the base 35. The lower laser heating devices 32 and the support block 34 are mounted directly on the base 35. The upper laser heating devices 31 and the notching devices 33 are supported by support structures 31a and 36, respectively, on the base 35. The notching devices 33 may be disposed on the downstream side of the upper laser heating devices 31 or the lower laser heating devices 32 with respect to the web feed direction.

A film regulation device 43 is disposed near the upper laser heating devices 31 and the lower laser heating devices 32 to regulate the vertical movement of the pair of laminated films 7. The film regulation device 43 has an upper regulation member 44 disposed above the pair of laminated films 7, and a lower regulation member 45 disposed below the pair of laminated films 7. The regulation members 44 and 45 are fixedly supported by support members 46 and 47, respectively, on the base 35. The regulation members 44 and 45 are disposed opposite to each other with respect to the pair of laminated films 7. Felt sheets 44a and 45a are attached to surfaces of the regulation members 44 and 45 facing the pair of laminated films 7, respectively. The film carrying line 25 and the notch and tearing incision forming unit 30 are controlled for operation by the control unit 40.

The operation of the package manufacturing system 10 will be described below. Referring to FIG. 1, the control unit 40 controls the web feed unit 11 for operation to feed the laminated films 7 continuously from the web roll at an optional feed speed. Each of the laminated films 7, in this embodiment, is a laminated structure formed by laminating a nylon film serving as the laser beam absorbing layer 5, and a linear low-density polyethylene film serving as a laser beam nonabsorbing layer 6 by a dry lamination process.

The pair of laminated films 7 is advanced through the first dancer roller unit 12, the feed rollers 13, and the second dancer roller unit 13 to the longitudinal heat-sealing unit 15. The longitudinal heat-sealing unit 15 bonds parts of the pair of laminated films 7 to form longitudinal heat-sealed sections 2a. In a section of the film feed line 25 below the longitudinal heat-sealing unit 15 with respect to the web feed direction, the pair of laminated films 7 are fed intermittently according to a signal provided by the control unit 40. A temporary slack in the pair of laminated films 7 in a section of the film feed line 25 between the web feed unit 11 and the longitudinal heat-sealing unit 15 is taken up by the first dancing roller unit 12 and the second dancing roller unit 14. The longitudinal heat-sealed sections 2a are cooled by the longitudinal cooling unit 16, and the pair of laminated films 7 are advanced through the rubber rollers 17 and the constant tension device 18 to the lateral heat-sealing unit 19.

The lateral heat-sealing unit 19 forms lateral heat-sealed sections 2b in the pair of laminated films 7, and then the lateral cooling unit 20 cools the lateral heat-sealed sections 2b. Thus, the longitudinal heat-sealed sections 2a and the lateral heat-sealed sections 2b are formed in the pair of laminated films 7 by the longitudinal heat-sealing unit 15 and the lateral heat-sealing unit 19 to define two rows of packages 1 in the pair of laminated films 7.

Then, the notch and tearing incision forming unit 30 forms notches 3 and tearing incisions 4 in the pair of laminated films 7. The pair of laminated films 7 are advanced by a distance corresponding to the feed pitch into the notch and tearing incision forming unit 30 and stopped. Then, the notching device 33 cuts parts of the pair of laminated films 7 to form two notches 3 in a substantially middle parts of the pair of laminated films 7. One of the notches 3 is for the packages 1 on one of the two rows and the other notch 3 is for the package 1 on the other row. The notches 3 are formed at positions on the opposite lateral edge parts of the package 1. The notches 3 may be formed in the shape of the letter U, the letter I or the letter V.

The upper laser heating devices 31 irradiate the upper laminated film 7 with laser beams. Then, the nylon film of the upper laminated film 7 absorbs the laser beams, so that parts of the nylon film is heated and fused to form two tearing incisions 4. One of the tearing incisions 4 is for the package 1 on one of the two rows, and the other tearing incision 4 is for the package 1 on the other row. Subsequently, the lower laser heating devices 32 irradiates the lower laminated film 7 with laser beams to form two tearing incisions 4 in the lower laminated film 7. The starting points of the tearing incisions 4 formed by the lower laser heating devices 32 are one feed pitch behind those of the tearing incisions 4 formed by the upper laser heating devices 31.

During the formation of the tearing incisions 4, the pair of laminated films 7 are restrained from vertical flapping movement by the pair of regulation members 44 and 45 of the film regulation device 43. Since the pair of laminated films 7 are restrained from vertical movement by the film regulation device 43, the upper laser heating devices 31 and the lower laser heating devices 32 are able to form the tearing incisions 4 accurately in the pair of laminated films 7. Since the surfaces of the regulation members 44 and 45 facing the pair of laminated films 7 are coated with the felt sheets 44a and 45a, respectively, the surfaces of the pair of laminated films 7 will not be damaged by the regulation members 44 and 45.

In the package manufacturing system 10 in the second embodiment, the notches 3 and the tearing incisions 4 are formed in the pair of laminated films 7 by the notch and tearing incision forming unit 30 after uniting together the pair of laminated films 7 by the longitudinal heat-sealing unit 15 and the lateral heat-sealing unit 19. Therefore, the notches 3 and the tearing incisions 4 can be accurately positioned. Since the upper laser heating devices 31, the lower laser heating devices 32, the notching device 33 and the film regulation device 43 are mounted on the base 35, the respective positions of the upper laser heating devices 31, the lower laser heating devices 32, the notching device 33 and the film regulation device 43 relative to each other are fixed. Therefore, the tearing incisions 4 in the upper laminated film 7 and the tearing incisions 4 in the lower laminated film 7 can be accurately aligned. The respective positions of the pair of tearing incisions 4 and the notches 3 can be easily changed simply by shifting the base 35.

The package 1 can be smoothly torn along the tearing incisions 4 formed in the upper and the lower laminated films 7 starting from the notch 3.

A support structure for supporting the upper laser heating devices 31, the lower laser heating devices 32 and the notching device 33, in a modification will be described with reference to FIG. 9. Referring to FIG. 9, the upper laser heating devices 31 and the notching devices 33 may be attached to gantry type support structures 37 and 38 set on the base 35. The lower laser heating devices 32 are attached directly to the base 35. The regulation member 44 of the film regulation device 43 is fixedly supported by a support member 47 on the base, and the regulation member 45 is fixedly supported by a support member 47 on the base 35 (FIG. 7).

Although the upper laser heating devices 31 and the lower laser heating devices 32 are spaced a distance corresponding to one feed pitch apart from each other in the foregoing embodiment, the upper laser heating devices 31 and the lower laser heating devices 32 may be disposed opposite to each other with respect to the pair of laminated films 7 so that the laser beams projected by the upper laser heating devices 31 and those projected by the lower laser heating devices 32 are inclined to each other.

As is apparent from the foregoing description, according to the present invention, the pair of laminated films can be restrained from vertical flapping movement by the film regulation device 43. Therefore, the tearing incisions can be accurately formed in the pair of laminated films and the package can be torn easily along the tearing incisions.

Third Embodiment

Figure 10:
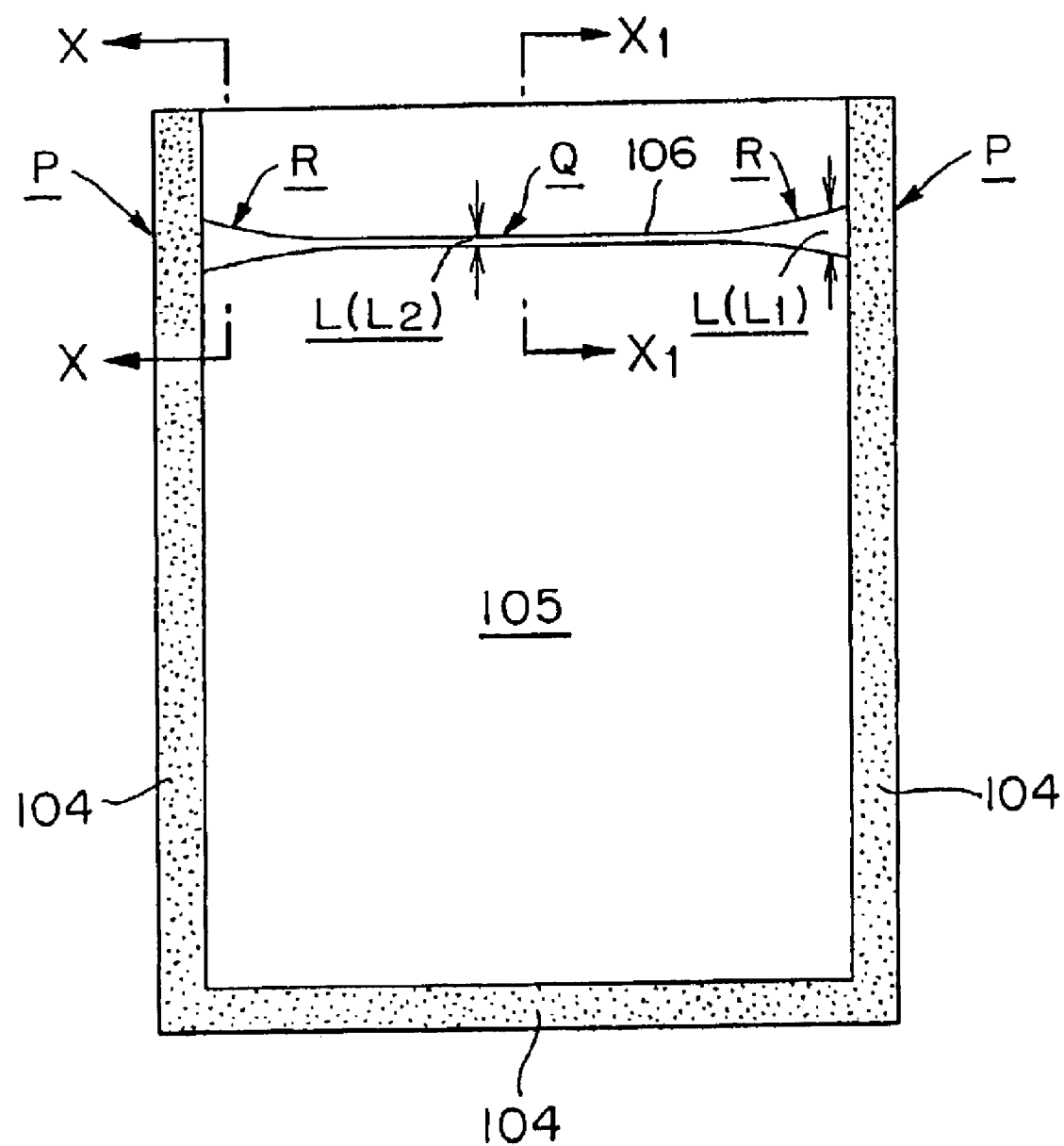
FIG. 10 is a schematic plan view of a package in a third embodiment according to the present invention.

A package in a third embodiment according to the present invention will be described hereinafter. FIG. 10 is a schematic plan view of an easily openable package 105 in a third embodiment according to the present invention, FIG. 11 is a sectional view taken on line X—X in FIG. 10, and FIG. 12 is a sectional view taken on line $X_1$—$X_1$ in FIG. 10. Referring to FIGS. 10 to 12, the package 105 is formed by uniting a pair of laminated films 103 each consisting of a heat-sealable resin film 101 serving as an inner layer, a strong resin film 102 serving as an outer layer, and a barrier film 101a having a barrier property and serving as an intermediate layer. The laminated films 103 are superposed with the heat-sealable resin films 101 thereof in contact with each other and peripheral parts of the laminated films 103 are united together by heat-sealing to form a heat-sealed part 104. Tearing incisions 106 are formed by laser beam machining in the strong resin films 102 serving as the front and the back layer of the package 105 at a position P corresponding to a tearing line. The width $L_1$ of end parts R of the tearing incisions 106 is twice to ten times as great as the width $L_2$ of a middle part Q of the tearing incisions.

As shown in FIGS. 11 and 12, in the package 105, the difference between the distance $T_1$ between, for example, the upper edge of the package 105 to the center of the tearing incision 106 in the front surface of the package 105 and the distance $T_2$ between the upper edge of the package 105 to the center of the tearing incision 106 in the back surface of the package 105 is in the range of 0 to 2 mm.

The width $L_1$ of end parts R of the tearing incisions 106 is twice to about ten times, more preferably, three times to about five times as great as the width $L_2$ of a middle part Q of the tearing incisions. If the ratio $L_1/L_1$ is two or below, or three or below, the package 105 cannot be easily torn and is torn irregularly and not linearly due to positional difference between the tearing incisions 106. If the ratio $L_1/L_1$ is ten or above, the strength of parts of the laminated films 103 corresponding to the end parts R of the package 105 is reduced and the package 105 is liable to break.

More concretely, in the package 105, the width $L_2$ of the middle part Q of each of the tearing incisions 106 is in the range of 20 to about 200 μm, more preferably, in the range of 50 to about 150 μm, and the width $L_1$ of the end parts R of the tearing incisions 106 is in the range of 40 to 2000 μm, more preferably, in the range of 100 to about 1500 μm.

It is desirable that the positional difference between the tearing incisions 106 formed in the front and the back surface, respectively, of the package 105 is in the range of 0 to about 2 mm, more preferably, in the range of 0 to 1 mm. It is desirable that the tearing incisions 106 formed in the front and the back surface, respectively, of the package 105 coincide with each other. If the positional discrepancy between the tearing incisions 106 formed in the front and the back surface, respectively, of the package 105 is not less than 2 mm, the package 105 cannot be easily opened and is torn irregularly and not linearly.

The easily openable package 105 described above is only an example and the present invention is not limited thereto in its practical application. For example, the present invention is applicable to packages of various shapes, such as those of self-supporting pouches, gusset pouches and the like.

Materials of the easily openable package 105 and a method of manufacturing the package 105 will be explained below. The heat-sealable resin film 101 serving as the inner layer may be a film or sheet capable of being fused and welded by heat, such as a film or sheet of one or some of acid-modified polyolefin resins each produced by modifying a low-density polyethylene, a medium-density polyethylene, a high-density polyethylene, a linear low-density polyethylene, polypropylene, an ethylene-vinyl acetate copolymer, an ionomer resin, an ethylene-ethyl acrylate copolymer, an ethylene-acrylate copolymer, an ethylene-methacrylate copolymer, an ethylene-propylene copolymer, a methyl pentene polymer, polyethylene or polypropylene by an unsaturated carboxylic acid, such as acrylic acid, methacrylic acid, maleic unhydride, fumaric acid, maleic unhydride, and other resins.

The thickness of the resin film 101 is 10 μm or above, preferably, 20 μm or above, more preferably, in the range of 30 to about 500 μm. It is desirable that the thickness of the heat-sealable resin film 101 is about twice to twenty times, preferably, four times to ten times as great as than that of the strong resin film 102 serving as the outer layer.

The resin film 101 of such a thickness used as the inner layer has a high rigidity and a high strength, and the package 105 formed by uniting together the pair of laminated films 103 each having resin film 101 and the resin film 102 having a high strength and serving as an outer layer has a satisfactory shape maintaining property felicitating work for refilling the package 105 with the contents and work for handling the package during distribution and at the store, and a capability of maintaining the aroma of the contents.

It is most preferable to use a film or sheet of a material containing a linear low-density polyethylene or an ethylene-vinyl acetate copolymer as a principal component as the heat-sealable film 101 serving as the inner layer. A film of a material containing a linear low-density polyethylene or an ethylene-vinyl acetate copolymer has a stickiness, is resistant to the propagation of fissures and a high shock resistance. Since the inner layer is always in contact with the contents, the film of a material containing a linear low-density polyethylene or a ethylene-vinyl acetate copolymer is effective in preventing the reduction of resistance to environmental stress cracking.

According to the present invention, the linear low-density polyethylene or the ethylene-vinyl acetate copolymer for forming the resin film 101 may be blended with another resin, such as an ethylene-butene copolymer or the like. If the resin film 101 is formed of the linear low-density polyethylene or the ethylene-vinyl acetate copolymer blended with an ethylene-butene copolymer, the heat resistance of the film is lower than that of the film of the linear low-density polyethylene or the ethylene-vinyl acetate copolymer, and the stability of the sealed part of the film tends to be deteriorated in a high-temperature environment, but the film has an improved tearing property which facilitate opening the package.

The strong resin film 102 having a rigidity and serving as the outer layer of the package 105 will be described below. The resin film 102 is a basic structural member of the package 105 and must be a film or sheet of a resin having excellent mechanical, physical, chemical and necessary properties. The resin film 102 may be a film or sheet of a polyester resin, a polyamide resin, a polyaramid resin, a polypropylene resin, a polycarbonate resin, a polyacetal resin, a fluorocarbon resin or a tough resin. The film or sheet of such a resin may be an unoriented film or sheet, a uniaxial oriented film or sheet a biaxial oriented film or sheet.

According to the present invention, the resin film 102 may be of a thickness sufficient to secure the least necessary strength and rigidity. The resin film 102 having an excessively big thickness cannot be properly processed by laser beam machining, has an excessive tear resistance and is costly. The resin film 102 having an excessively small thickness has insufficient strength and rigidity. According to the present invention, the thickness of the resin film 102 is in the range of about 10 to about 50 $\mu$m, more desirably, in the range of about 12 to about 25 $\mu$m.

According to the present invention, it is most preferable to use, as the resin film 102 serving as the outer layer, a biaxial oriented polyamide film or a biaxial oriented polyethylene terephthalate film having rigidity, excellent in mechanical toughness, elasticity, penetration resistance, shock resistance, abrasion resistance, low-temperature resistance, heat resistance, and chemical resistance, such as solvent resistance, and having high printability.

The orientation of the polymers of the biaxial oriented polyamide film or the biaxial oriented polyethylene terephthalate film is nearly the same as a feed direction in which the biaxial oriented polyamide or polyethylene terephthalate film is fed, discrepancy in the mode of tearing between the laminated biaxial oriented polyamide or polyethylene terephthalate films is very small, and tearing incisions can be easily formed by laser beam machining in such a biaxial oriented polyamide or polyethylene terephthalate film because the wavelength of a laser beam projected by a carbon dioxide gas laser is within the absorption band of the biaxial oriented polyamide or polyethylene terephthalate film.

According to the present invention, the package 105 is formed by uniting a pair of laminated films 103 each consisting of a heat-sealable resin film 101 serving as an inner layer, a strong resin film 102 serving as an outer layer, and a barrier film 101a having a barrier property and serving as an intermediate layer. The intermediate layer having a barrier property may be a film capable of intercepting light, such as sunlight, or a film impermeable to water vapor, water or gases, such as oxygen gas and such. The film serving as the intermediate layer may be a film of a single material or a film of a compound material produced by combining a plurality of materials.

More specifically, the film serving as the intermediate layer may be a resin film coated with an aluminum foil or an aluminum film deposited by evaporation and having both shading and barrier properties, a resin film coated with an inorganic oxide film deposited by evaporation and having a barrier property, such as a silicon dioxide film, or an alumina film, a film or sheet impermeable to water vapor and water, such as a film or sheet of a low-density polyethylene, a medium-density polyethylene, a high-density polyethylene, a linear low-density polyethylene, polypropylene or an ethylene-propylene copolymer, a film or sheet having a gas-barrier property, such as a film or sheet of polyvinylidene chloride, polyvinyl alcohol, a saponified ethylene-vinyl acetate copolymer, or a film or sheet of a shading colored resin prepared by kneading a mixture prepared by mixing a resin, a coloring matter, such as a pigment, and desired additives. The film may be formed of one or some of those materials.

Although the thickness of the film or sheet serving as the barrier film 101a is optional, it is desirable that the thickness of the film or sheet serving as the intermediate layer is in the range of 5 to about 300 $\mu$m, more preferably, in the range of 10 to about 100 $\mu$m.

The aluminum foil may be of a thickness in the range of 5 to about 30 $\mu$m. The aluminum or the inorganic oxide film deposited by evaporation may of a thickness in the range of 100 to about 2000 Å.

The resin film coated with the evaporated film may be, for example, a polyester film, a polyamide film, a polyolefin film, a vinyl chloride film, a polycarbonate film, a polyvinylidene chloride film, a polyvinyl alcohol film, a saponified ethylene-vinyl acetate copolymer film or the like.

The inorganic oxide forming the evaporated inorganic oxide film may be, for example, silicon oxide ($SiO_x$), alumina, indium oxide, tin oxide, zirconium oxide or the like.

The inorganic oxide may be a mixture of silicon oxide and silicon dioxide, or a mixture of silicon dioxide and alumina.

The thin inorganic oxide thin film may be formed by a vacuum evaporation method, such as an ion beam evaporation method or an electron beam evaporation method, or a sputtering method.

Usually, the preferable thickness of the inorganic oxide thin film is in the range of 100 to about 2000 Å to provide the inorganic oxide thin film with a sufficient barrier property.

According to the present invention, it is desirable that the thickness of the inorganic oxide thin film is in the range of 150 to about 1500 Å.

If the thickness of the inorganic oxide thin film is greater than 1500 Å, more particularly, greater than 2000 Å, the inorganic oxide thin film is liable to crack to deteriorate its barrier property and to increase its material cost.

Usually, the package is used under severe physical and chemical conditions, the component laminated films must meet severe requirements of packages, such as strength resisting deformation, drop-and-impact strength, pinhole resistance, heat resistance, sealing performance, quality maintenance performance, workability, hygienic compatibility and the like. The present invention may employ materials meeting those conditions other than the foregoing materials. Suitable laminated films as the component laminated films of the packages of the present invention, by way of example, are films or sheets of low-density polyethylenes, medium-density polyethylenes, high-density polyethylenes, linear low-density polyethylenes, polypropylene, ethylene-propylene copolymers, ethylene-vinyl acetate copolymers, ionomer resins, ethylene-ethyl acrylate copolymers, ethylene-acrylate copolymers, ethylene-methacrylate copolymers, methyl pentene polymers, polybutene resins, polyvinyl chloride resins, polyvinyl acetate resins, polyvinylidene chloride resins, vinyl chloride-vinylidene chloride copolymers, polymethacrylate resins, polyacrylonitrile resins, polystyrene resins, acrylonitrile-styrene copolymers (AS resins), acrylonitrile-butadiene-styrene copolymers (ABS resins), polyester resins, polyamide resins, polycarbonate resins, polyvinyl alcohol resins, saponified ethylene-vinyl acetate copolymers. fluorocarbon resins, diene resins, polyacetal resins, polyurethane resins, nitrocellulose and the like.

Cellophane and synthetic paper sheets may be used.

According to the present invention, the foregoing films or sheets may be unoriented, uniaxial oriented or biaxial oriented films or sheets.

The thickness of the films or sheets is optional, but the thickness may be in the range of several micrometers to about 300 $\mu$m.

According to the present invention, the films or sheet may be produced by an extrusion process, an inflation process or a coating process.

According to the present invention, the laminated film 103 may be a two-layer laminated film formed by laminating the heat-sealable resin film 101 serving as the inner layer, and the strong resin film 102 serving as the outer layer, may be a three-layer laminated film formed by laminating the heat-sealable resin film 101, the strong resin film 102, and the barrier film 101a or may be a laminated film consisting of more than three layers A method of manufacturing the laminated film 103 will be described below. The method of manufacturing the laminated film may employ a lamination process employed in manufacturing ordinary packaging materials, such as a wet lamination process, a dry lamination method, a solventless dry lamination process, an extrusion lamination process, a T-die coextrusion process, a coextrusion lamination process, an inflation process or the like.

According to the present invention, the component films of the laminated film 103 may be subjected, if necessary, to a pretreatment process, such as a corona discharge treatment or an ozone treatment. The present invention may use an anchor coating material, such as an isocyanate (urethane) coating material, polyethylene imine coating material, a polybutadiene coating material, or an organic titanium coating material, or a laminating adhesive, such as a polyurethane adhesive, a polyacrylic adhesive, a polyester adhesive, an epoxy adhesive, a polyvinyl acetate adhesive, a cellulose adhesive or the like.

A method of manufacturing the easily openable package 105 by processing the laminated films 103 consisting of at least two layers or three or more layers will be described. The easily openable package 105 is formed by uniting the pair of laminated films 103 consisting of at least the heat-sealable resin film 101 serving as the inner layer, and the strong resin film 102 serving as the outer layer. The pair of laminated films 103 are laminated with their heat-sealable resin films 101 facing each other, and peripheral parts of the laminated films 103 are united together by heat-sealing to form a heat-sealed part 104.

More concretely, the method of manufacturing the package 105 may fold the laminated film 103 having at least two layers or superposes the laminated films 103 so that the inner layers face each other, and bond together parts of the inner layers by heat-sealing in a sealing type, such as a side seal type, a two-sided seal type, a three-sided seal type, a four-sided seal type, an envelop seal type, a pillow seal type, a gusset seal type, a flat bottom seal type, a square bottom seal type or the like. The package 105 may be a standing pouch. The heat-sealing method may be a bar sealing method, a roller sealing method, a belt sealing method, an impulse sealing method, a high-frequency sealing method, an ultrasonic sealing method or the like.

A method of forming the tearing incisions 106 in the strong resin films 102 serving as the front and the back outer layer at an optimum position on the package 105 will be described hereinafter. The tearing incisions 106 may be formed, for example, by a needle punching method which presses a hot needle against a film, a melt boring method which melts a film with an embossing roller, a grinding roller, a grinding stone, an abrasive tape or the like, a physical boring method which uses a knife, a cutter or the like, a laser beam machining method, a processing method which uses corona discharge or plasma discharge, or the like.

According to the present invention, the tearing incision 106 may be formed in the strong resin film 102 before bonding the strong resin film 102 with another one, after laminating the strong resin film 102 and the heat-sealable resin film 101 to form the two-layer laminated film 103, after uniting together the two laminated films 103 in the package 105.

According to the present invention, the tearing incision 106 may be of any optional shape, such as the shape of a straight line, a curved line, a perforated line, the strong resin film 101 may be provided with any suitable number of tearing incisions 106, and the tearing incision a broken line or the like, the tearing incision 106 may be either continuous or discontinuous. Thus the tearing incision 106 may be formed in any shape formed of through holes, a groove or a mixture of through holes and a groove, provided that the package 105 can be torn along the tearing incision 106.

According to the present invention, it is most preferable to form the tearing incision 106 in the strong resin film 102 in the shape of a perforated line by irradiating the strong resin film 102 with a pulsed laser beam emitted by a pulsed laser. When forming the tearing incision 106 in the resin film 102 by laser beam machining, the resin film 102 must absorb energy of a wavelength corresponding to that of the laser beam. Therefore, a carbon dioxide gas laser is an optimum laser for forming the tearing incision 106.

Nylon films, polyester films or the like absorb a 10.6 $\mu$m wavelength laser beam emitted by a carbon dioxide gas laser at a high absoptivity, while films of a material containing a linear low-density polyethylene or a ethylene-vinyl acetate copolymer as a principal component transmits most parts of such a laser beam. Therefore, the present invention uses a film of a material containing a linear low-density polyethylene or a ethylene-vinyl acetate copolymer as a principal component as the heat-sealable resin film 101 serving as an inner layer, uses a biaxial oriented nylon film or a biaxial oriented polyethylene terephthalate film as the strong resin film 102 serving as an outer layer, forms the two-layer laminated film 103 by laminating the heat-sealable resin film 101 and the strong resin film 102, and irradiates the two-layer laminated film 103 with the laser beam emitted by a carbon dioxide gas laser for processing. Thus the tearing incision 106 can be formed only in the strong resin film 102 of a material containing a linear low-density polyethylene or a ethylene-vinyl acetate copolymer as a principal component, the film 102 of a material containing a linear low-density polyethylene or a ethylene-vinyl acetate copolymer as a principal component will not melt and close the tearing incision and hence the package can be very satisfactorily torn to open the same.

The tearing incision may be formed in the strong resin film 102 by irradiating the strong resin film 102 with the laser beam emitted by a carbon dioxide gas laser after forming the package 105 out of the laminated film 103 instead of forming the tearing incision in the strong resin film 102 of the laminated film before processing the laminated film 103 to form the package 105.

According to the present invention, the tearing incision can be formed only in the film 102 serving as the outer layer by laser beam machining using a laser beam of an appropriate wavelength.

According to the present invention, the tearing incisions 106 can be formed in the package 105 by laser beam machining.

According to the present invention, the tearing incisions 106 are formed in the front and the back surface of the package 105 by laser beam machining, the width L, of the end parts R of the tearing incisions 106 is twice to about ten times as great as the width $L_2$ of the middle part Q of the tearing incisions. The difference between the respective positions of the tearing incisions 106 formed in the front and the back surface of the package 105 is in the range of 0 to 2 mm. The package 105 is formed by superposing the two-layer laminated films 103 each consisting of at least the heat-sealable resin film 101 serving as the inner layer, and the strong resin film 102 serving as the outer layer with the heat-sealable resin films 101 in contact with each other, and uniting together peripheral parts of the laminated films 103 by heat-sealing to form the heat-sealed part 104. Then, the package 105 is irradiated with laser beams of a fixed intensity projected by two laser heating devices disposed on the opposite sides of the package 105 while the package 105 is advanced intermittently. Since the advancing speed of the package increases from zero at an initial stage of advancement, maintains constant on a high level at a middle stage and then decreases to zero at a final stage of advancement. Therefore, parts of the package 5 corresponding to the end parts R of the tearing incisions 106 receive a large quantity of energy of the laser beam and parts of the package 5 corresponding to the middle part Q of the tearing incisions 106 receive a quantity of energy of the laser beam smaller than that received by the parts of the package 5 corresponding to the end parts R. Consequently, each tearing incision 106 has the end parts R of the width $L_1$ twice to about ten times as great as the width $L_2$ of the middle part Q thereof.

The positions of the laser heating devices relative to the packages 105 may be continuously monitored by sensing devices, such as CCD cameras or infrared cameras, to regulate the positions of the laser beams on the packages 105 so that the difference between the positions of the tearing incisions 106 formed in the front and the back surface of the package 105 is in the range of 0 to 2 mm.

A tearing incision 106 having the end parts R of the width $L_1$ twice to about ten times as great as the width $L_2$ of the middle part Q thereof may be formed by irradiating the package 105 with a laser beam while the package 105 is kept stationary, and varying the intensity of the laser beam so that parts of the package 105 corresponding to the end parts R of the tearing incision 106 is irradiated with the laser beam of a relatively high intensity, and a part of the package 105 corresponding to the middle part Q of the tearing incision 106 is irradiated with the laser beam of a relatively low intensity, and the width $L_1$ of the end parts R of the tearing incision 106 is twice to about ten times greater than the width $L_2$ of the middle part Q the same.

According to the present invention, a detergent (either liquid or powder detergent) is supplied through an opening formed in one end part of the easily openable package 105, and then the end part of the package 105 is closed in a heat-sealed part 104 by heat-sealing.

Thus, the easily openable package 105 satisfies requirements including shock resistance, resistance against environmental stress cracking, sealing stability, ability to maintain aroma, quality maintenance performance, and prevents troubles in packaging performance during distribution. The appropriate rigidity of the package 105 facilitates handling the package 105, the package 105 can be easily torn along the tearing incisions 106 and can be easily handled.

The package 105 according to the present invention is suitable, in addition to containing a detergent, for containing various articles, such as beverages, foods, seasonings, fruit juices, medicines, industrial articles and the like.

The package 105 according to the present invention may be provided with a slide fastener. Notches may be formed at the opposite ends of a section of the sealed part of the package 105 corresponding to the opposite ends of the tearing incisions 106.

EXAMPLES

Concrete examples of packages will be described hereinafter.

Example 1

A two-layer laminated film 103 was made by coating a surface of a 25 μm thick biaxial oriented nylon film 102 with a two-component urethane adhesive in a dry basis weight of about 5 g/cm², and laminating a 130 μm thick linear low-density polyethylene film 101 to the surface of the biaxial oriented nylon film 102 coated with the two-component urethane adhesive.

The laminated film 103 was processed to form a front wall, a back wall and a bottom wall having the shape of an inverted letter V, the front wall, the back wall and the bottom wall were combined so that the linear low-density polyethylene films 101 of those walls face each other, and peripheral parts of the walls were united together by heat-sealing to form an easily openable package 105, namely, a standing pouch, of 125 mm in width and 250 mm in height having an opening. Packages 105 thus formed were fed intermittently at a rate of 40 packages/min. Carbon dioxide gas lasers (Synrad, USA) were disposed on the opposite sides of a pouch feed line so that laser beams projected by the carbon dioxide gas lasers fall on the opposite end parts of the package 105 when the package 105 is stopped. Appropriate parts of the front and the back wall of the packages 105 were irradiated with laser beams of 10.6 μm in wavelength and 4 W in power continuously while the packages 105 were advanced intermittently to form tearing incisions 106 each having end parts R of a width greater than that of a middle part Q in the front and the back wall of the packages 105. The positions of the tearing incisions 106 formed in the front and the back wall of packages 105 were dislocated relative to each other to produce the easily openable packages 105 in Examples 1A, 1B and 1C differing from each other in discrepancy in the range of 0 to 2 mm between the positions of the tearing incisions formed in the front and the back wall. I-shaped notches were formed in each package 105 at the opposite ends of the tearing incisions 106. In the package 105 in which the tearing incisions 106 formed in the front and the back wall of the package 105 are dislocated from each other, the I-shaped notches were formed at the middle between the tearing incisions 106.

Comparative Example 1

Easily openable packages 105, namely, standing pouches, similar to those in Example 1 were irradiated with laser beams of 4 W in power projected by the same carbon dioxide gas lasers as those employed in forming the tearing incisions 106 in the packages 105 in Example 1 while the packages 105 were advanced continuously at a feed speed of 30 m/min to form tearing incisions 106 of a fixed width in the packages 105 in Comparative example 1. The positions of the tearing incisions 106 formed in the front and the back wall of packages 105 were dislocated relative to each other to produce the easily openable packages 105 in Comparative examples 1D, 1E and 1F differing from each other in discrepancy in the range of 0 to 2 mm between the positions of the tearing incisions formed in the front and the back wall. I-shaped notches were formed in the package 105 in a manner similar to that in which the I-shaped notches were formed in the packages 105 in Examples 1A, 1B and 1C.

Comparative Example 2

Easily openable packages 105, namely, standing pouches, similar to those in Example 1 were irradiated with laser beams of 10 W in power projected by carbon dioxide gas lasers while the packages 105 were advanced continuously at a feed speed of 30 m/min to form tearing incisions 106 of a fixed width in the packages 105 in Comparative example 2. The positions of the tearing incisions 106 formed in the front and the back wall of packages. 105 were dislocated relative to each other to produce the easily openable packages 105 in Comparative examples 2G, 2H and 2I differing from each other in discrepancy in the range of 0 to 2 mm between the positions of the tearing incisions formed in the front and the back wall. I-shaped notches were formed in the package 105 in a manner similar to that in which the I-shaped notches were formed in the packages 105 in Examples 1A, 1B and 1C.

Tests

Table 1 shows the width of the middle parts Q and the width of end parts R of the tearing incisions 106 of the easily openable packages 105 in Example 1 and Comparative examples 1 and 2, and data obtained through tests.

TABLE 1

| | | Width ($\mu$m) | | Discrepancy between tearing incisions | Tear | Drop-and-impact | Pressure |
|---|---|---|---|---|---|---|---|
| | | Q | R | (mm) | Property | test | test |
| Ex. 1 | A | 110 | 500 | 0 | ○ (0/10) | ○ (0/10) | ○ |
| | B | 110 | 500 | 1 | ○ (0/10) | ○ (0/10) | ○ |
| | C | 110 | 500 | 2 | ○ (0/10) | ○ (0/10) | ○ |
| Comp. Ex. 1 | D | 130 | 130 | 0 | ○ (0/10) | ○ (0/10) | ○ |
| | E | 130 | 130 | 1 | X (3/10) | ○ (0/10) | ○ |
| | F | 130 | 130 | 2 | X (10/10) | ○ (0/10) | ○ |
| Comp. Ex. 2 | D | 300 | 300 | 0 | ○ (0/10) | X (8/10) | X |
| | E | 300 | 300 | 1 | ○ (0/10) | X (7/10) | X |
| | F | 300 | 300 | 2 | X (2/10) | X (5/10) | X |

Tear Property

Sample packages were filled with 500 ml of water and their filling openings were heat-sealed by heating at 140° C. for 0.5 sec. The sample packages were torn by hand to evaluate the tear property thereof. In Table 1, numerals in a column for tear property indicate (the number of packages which were not torn satisfactorily)/(the number of packages tested), blank circles (○) indicate good tear property and crosses (X) indicate bad tear property.

Drop-and-Impact Test

Sample packages were filled with 500 ml of water and their filling openings were heat-sealed by heating at 140° C. for 0.5 sec. The sample packages were dropped ten times with their sealed filling openings down from a height of 120 cm. In Table 1, numerals in a column for drop-and-impact test indicate (the number of broken packages)/(the number of packages tested), blank circles (○) indicate sufficiency in drop-and-impact strength and crosses (X) indicate insufficiency in drop-and-impact strength.

Pressure Test

Sample packages were filled with 500 ml of water and their filling openings were heat-sealed by heating at 140° C. for 0.5 sec. A pressure of 30 kg was applied for 5 min to the sample packages. In a column for pressure test, blank circles (○) indicate that the packages did not tear and crosses (X) indicate that packages tore from the tearing incisions.

As is obvious from Table 1, all the sample packages in Example 1 have satisfactory tear property regardless of the discrepancy between the positions of the tearing incisions formed respectively in the front and the back surface of the sample packages, and excellent in drop-and-impact strength and burst strength.

The tear property of the sample packages in Comparative example 1 is unsatisfactory if the discrepancy between the positions of the tearing incisions formed respectively in the front and the back surface of the sample packages is 1 mm or above. Although the sample packages in Comparative example 2 are satisfactory in tear property even if the discrepancy between the positions of the tearing incisions formed respectively in the front and the back surface of the sample packages is 1 mm, the drop-and-impact strength and the burst strength of the same are low, and the same are unsatisfactory in tear property when the discrepancy between the positions of the tearing incisions formed respectively in the front and the back surface of the sample packages is 2 mm.

As is apparent from the foregoing description, according to the present invention, the laminated film 103 having at least two layers is formed by laminating the heat-sealable resin film 101 serving as the inner layer, and the strong resin film 102 serving as the outer layer, and the package 105 is formed from the laminated film 103. The package 105 is formed by superposing the laminated films 103 with their heat-sealable resin films 101 facing each other, and uniting together peripheral parts of the laminated films 103 by heat-sealing to form the heat-sealed part 104. The tearing incisions 106 are formed in the strong resin films 102 having an appropriate rigidity and serving as the outer layers of the front and the back wall of the package 105 at the positions of optimum tearing lines on the package 105. The width $L_1$ of the end parts R of the tearing incisions 106 is twice to about ten times as great as the width $L_2$ of the middle part Q the same. The package 105 is filled with a detergent through a filling opening, and then the package 105 is sealed by closing the filling opening by heat-sealing. The package 105 has a sufficient strength, can be easily and neatly torn along the tearing incisions formed in the front and the back surface thereof, and the tear property of the package 105 is affected scarcely by the discrepancy between the respective positions of the tearing incisions formed in the front and the back surface of the package 105.

What is claimed is:

1. A package manufacturing system for manufacturing a package by uniting films opposite to each other, each having at least a laser beam absorbing layer, said package manufacturing system comprising:

a film feed line for feeding the films;

a heat-sealing unit disposed on the film feed line for uniting the laminated films;

a laser beam machining unit for projecting laser beams on respective surfaces of the films to form tearing incisions on a surface of the films by heating and melting the laser beam absorbing layers of the films; and a cutting unit for cutting the laminated films into a package, wherein the laser beam machining unit comprises a first laser heating device disposed on the film feed line to form the tearing incisions on the surface of one of the films by heating and melting the laser absorbing layer of the film with laser beams, and a second laser heating device disposed on the film feed line to form the tearing incisions on the surface of the other of the films by heating and melting the laser absorbing layer of the film with laser beams; and the first and the second laser heating devices are supported on a base.

2. The package manufacturing system according to claim 1 further comprising a notch forming unit disposed near the laser beam machining unit to form notches in parts of the films corresponding to part in end edge parts of the package.

3. The package manufacturing system according to claim 1 further comprising:

a notching device disposed on the base to form notches in parts of the films corresponding to parts of end edge parts of the package.

4. The package manufacturing system according to claim 1, wherein the film feed line feeds the films intermittently by a feed pitch at a time, and the first laser heating devices and the second laser heating devices are spaced apart a distance equal to the feed pitch with respect to a film feed direction.

5. The package manufacturing system according to claim 1, wherein the first laser heating devices and the second laser heating devices are disposed on the opposite sides of the films, respectively, and the laser beams projected by the first laser heating devices and those projected by the second laser heating devices are inclined to each other.

6. A package manufacturing system, for manufacturing a package by uniting films opposite to each other, each having at least a laser beam absorbing layer, said package manufacturing system comprising:

a film feed line for feeding the films;

a heat-sealing unit disposed on the film feed line for uniting the laminated films;

a laser beam machining unit for projecting laser beams on respective surfaces of the films to form tearing incisions on a surface of the films by heating and melting the laser beam absorbing layers of the films; and a cutting unit for cutting the laminated films into a package wherein the laser beam machining unit comprises a first laser heating device disposed on the film feed line to form the tearing incisions on the surface of one of the films by heating and melting the laser absorbing layer of the film with laser beams, and a second laser heating device disposed on the film feed line to form the tearing incisions on the surface of the other of the films by heating and melting the laser absorbing layer of the film with laser beams;

the film feed line, the first laser heating device and the second laser heating device are controlled by a control unit; and the control unit controls the film feed line to feed the films intermittently by a feed pitch at a time, and actuates the first and the second laser heating devices only while the laminated films are being fed.

7. The package manufacturing system according to claim 6 further comprising:

a notching device disposed on the film feed line to form notches in parts of the films corresponding to parts of end edge parts of the package, wherein the control unit provide a notching signal for actuating the notching device at a moment determined in connection with a feed time in which the films are fed, and controls the first and the second laser heating devices in accordance with the notching signal.

8. The package manufacturing system according to claim 7 wherein the control unit provides the notching signal to actuate the notching device while the films are kept stationary, actuates the first and the second laser heating devices a first time $t_1$ after a moment when the notching signal is provided and stops the first and the second laser heating devices a second time $t_2$ longer than the first time $t_1$ after the moment when the same notching signal is provided.

9. A package manufacturing system, for manufacturing a package by uniting films opposite to each other, each having at least a laser beam absorbing layer, said package manufacturing system comprising:

a film feed line for feeding the films;

a heat-sealing unit disposed on the film feed line for uniting the laminated films;

a laser beam machining unit for projecting laser beams on respective surfaces of the films to form tearing incisions on a surface of the films by heating and melting the laser beam absorbing layers of the films; and a cutting unit for cutting the laminated films into a package wherein the laser beam machining unit comprises a first laser heating device disposed on the film feed line to form the tearing incisions on the surface of one of the films by heating and melting the laser absorbing layer of the film with laser beams, and a second laser heating devices disposed on the film feed line to form the tearing incisions on the surface of the other of the films by heating and melting the laser absorbing layer of the film with laser beams; and film regulation means for regulating movement of the films in directions perpendicular to the films is disposed near the first and the second laser heating devices.

10. The package manufacturing system according to claim 9, wherein the film regulation means comprises a pair of film regulation members disposed opposite to each other on the opposite sides of the films, respectively, and felt sheets are attached to surfaces of the film regulation members facing the films.

* * * * *